United States Patent
Scoggins et al.

(10) Patent No.: US 9,710,987 B2
(45) Date of Patent: Jul. 18, 2017

(54) SYSTEMS AND METHODS FOR USE IN ACQUIRING CREDENTIALS FROM A PORTABLE USER DEVICE IN UNLOCKING DOOR LOCK SYSTEMS

(71) Applicant: HLT Domestic IP, LLC, McLean, VA (US)

(72) Inventors: Chuck Scoggins, Memphis, TN (US); Durga Prasad Koka, Memphis, TN (US)

(*) Notice: Subject to any disclaimer, the term of this patent is extended or adjusted under 35 U.S.C. 154(b) by 0 days.

(21) Appl. No.: 14/597,114

(22) Filed: Jan. 14, 2015

(65) Prior Publication Data
US 2015/0199863 A1 Jul. 16, 2015

Related U.S. Application Data

(60) Provisional application No. 61/927,885, filed on Jan. 15, 2014.

(51) Int. Cl.
*G07C 9/00* (2006.01)
*G06F 21/33* (2013.01)
(Continued)

(52) U.S. Cl.
CPC ....... *G07C 9/00904* (2013.01); *G06F 21/335* (2013.01); *G06F 21/35* (2013.01);
(Continued)

(58) Field of Classification Search
CPC ............ G07C 9/00904; G07C 9/00111; G07C 9/00817; G07C 9/00571; G07C 2009/00865; G07C 9/00309
See application file for complete search history.

(56) References Cited

U.S. PATENT DOCUMENTS 7,012,503 B2   3/2006 Nielsen
2003/0208386 A1* 11/2003 Brondrup ............... G06Q 10/02
                                                    705/5
(Continued)

FOREIGN PATENT DOCUMENTS

WO    WO 2014-007870      1/2014

OTHER PUBLICATIONS

PCT; PCT/US2015/011544; International Search Report and Written Opinion mailed Apr. 30, 2015.
(Continued)

*Primary Examiner* — Nabil Syed
(74) *Attorney, Agent, or Firm* — Fitch, Even, Tabin & Flannery LLP

(57) ABSTRACT

Some embodiments comprises methods of providing a guest with security credentials to gain access to a guest room, the methods comprise: identifying a user; identifying a guest room of multiple guests rooms at a property and with which the user is intended to occupy; acquiring a first security credential intended to be validated by a door lock system of a door to the identified guest room; and causing the first security credentials to be communicated, over a distributed network, to a portable consumer electronic user device associated with the user to be stored on the user device such that the user device is configured to wirelessly communicate the first security credential to the door lock system to gain access to the guest room.

18 Claims, 10 Drawing Sheets

(51) Int. Cl.
*G06F 21/35* (2013.01)
*H04L 29/06* (2006.01)
*H04W 4/00* (2009.01)

(52) U.S. Cl.
CPC ...... *G07C 9/00111* (2013.01); *G07C 9/00571* (2013.01); *G07C 9/00817* (2013.01); *H04L 63/0807* (2013.01); *G06F 2221/2147* (2013.01); *G07C 9/00309* (2013.01); *G07C 2009/00865* (2013.01); *H04L 63/0492* (2013.01); *H04W 4/008* (2013.01)

(56) References Cited

U.S. PATENT DOCUMENTS

| | | | |
|---|---|---|---|
| 2007/0176739 A1* | 8/2007 | Raheman | H04W 12/04 340/5.64 |
| 2013/0024222 A1* | 1/2013 | Dunn | G07C 9/00571 705/5 |
| 2013/0059603 A1* | 3/2013 | Guenec | G06Q 10/02 455/456.2 |
| 2013/0257590 A1 | 10/2013 | Kuenzi et al. | |
| 2015/0170448 A1* | 6/2015 | Robfogel | G07C 9/00904 340/5.61 |

OTHER PUBLICATIONS

Openways; "The Security Breach Affecting Millions of Hotel Rooms Finally Addressed Thanks to the Power of Smartphones" ; http://web.archive.org/web/20131229104332/http://www.openways.com/pages/home.html; Oct. 1, 2012; 2 pages.
Yikes; "The New Norm in Hotel Room Access Solutions" ; http://web.archive.org/web/20130923110539/https://yikes.co/; May 2013; 3 pages.
Openways; "Compatible Today with All Cell Phones Worldwide" ; http://web.archive.org/web/20131229104332/http://www.openways.com/pages/home.html; Dec. 29, 2013.
Openways; "Frequently Asked Questions" ; pp. 4.
Openways; http://openways.com/; Dec. 26, 2013.

* cited by examiner

SYSTEMS AND METHODS FOR USE IN ACQUIRING CREDENTIALS FROM A PORTABLE USER DEVICE IN UNLOCKING DOOR LOCK SYSTEMS

This application claims the benefit of U.S. Provisional Application No. 61/927,885, filed Jan. 15, 2014, for Scoggins et al., entitled SYSTEMS AND METHODS FOR USE IN ACQUIRING CREDENTIALS FROM A PORTABLE USER DEVICE IN UNLOCKING DOOR LOCK SYSTEMS, which is incorporated in its entirety herein by reference.

BACKGROUND

1. Field of the Invention

The present invention relates generally to door lock systems, and more specifically to acquiring credentials in unlocking doors.

2. Discussion of the Related Art

There are many different types of door locks that have different ways to unlock them. Hotels typically have larger numbers of rooms. Often hotels use key cards that can be read by a reader of a door lock to unlock a room.

The key cards are typically programmed with credentials or credentials are written to a card. Further, the programming of the credentials to a card or writing of the credentials to a card is typically performed at a front desk of the hotel.

SUMMARY OF THE INVENTION

Some embodiments provide apparatuses for use in unlocking a door of a guest room, the apparatuses comprise: a lock controller configured to couple with and control an electromechanical lock system of a door; a primary credentials reader coupled with the lock controller, wherein the primary credentials reader is configured to obtain a primary security credential from a primary credentials source and provide the lock controller with the primary security credential; and a low power wireless receiver coupled with the lock controller and configured to wirelessly receive, from a portable consumer electronic user device positioned proximate the wireless receiver and having processor readable memory configured to store an alternate security credential, the alternate security credential and to forward the alternate security credential to the lock controller; wherein the lock controller is configured to activate the lock system of the door to unlock the door allowing the door to be opened in response to verifying the alternate security credential.

Further, some embodiments comprise methods of providing a secure locking system, the methods comprising: opening a housing of an electromechanical door lock system mounted on a door; positioning a wireless receiver within the housing, wherein the wireless receive comprises a low power wireless receiver configured to wirelessly receive a security credential wirelessly communicated from a portable consumer electronic user device located proximate the wireless receiver and having processor readable memory configured to store the security credential; coupling the wireless receiver with a lock controller of the door lock system, wherein the wireless receiver is further configured to forward the security credential to the lock controller; and closing the housing of the door lock system such that the lock controller and the wireless receiver are positioned within the housing.

Other embodiments provide methods of providing a secure locking system, the methods comprising: obtaining an alternate security credentials system; cooperating the alternate security credentials system with an existing door lock system configured to provide lock control of a door lock, wherein the existing door lock system comprises a primary credentials receiver configured to receive primary security credentials through a different method than the alternate security credentials system is configured to receive alternate security credentials.

Some embodiments comprises methods of providing a guest with security credentials to gain access to a guest room, the methods comprise: identifying a user; identifying a guest room of multiple guests rooms at a property and with which the user is intended to occupy; acquiring a first security credential intended to be validated by a door lock system of a door to the identified guest room; and causing the first security credentials to be communicated, over a distributed network, to a portable consumer electronic user device associated with the user to be stored on the user device such that the user device is configured to wirelessly communicate the first security credential to the door lock system to gain access to the guest room.

Further, some embodiments include methods of allowing a user to gain access to a guest room, the methods comprising: accessing, from a portable consumer electronic user device communicating over a distributed network, a remote service; communicating, through the user device, authentication information to the remote service; requesting a security credential configured to be communicated by the user device to a door lock system of the guest room to allow a user to gain access to the guest room; and receiving, at the user device and from the remote service, a security credential and storing within the user device the security credential configured to be wirelessly communicated by the user device to the door lock system to gain access to the guest room when the security credential is verified by the door lock system.

Still further, some embodiments include methods of providing user with access to a guest room, the methods comprising: receiving, at a portable consumer electronic user device, an instruction to communicate a security credential to a door lock system configured to unlock a lock of the door lock system on a door to a guest room upon verifying the security credential; accessing the security credential stored local on the user device; and wirelessly communicating the security credential to the door lock system to be verified by the door lock system in response to the instruction to communicate the security credentials.

Other embodiments provide systems for use in distributing security credentials, the systems comprising: hospitality service communicationally coupled with a distributed network and configured to generate and make accessible over the distributed network an application program interface, wherein the application program interface is configured to communicate at least with a portable consumer electronic user device configured to receive one or more security credentials and to wirelessly transmit at least one of the one or more security credentials to a door lock system; a property server communicationally coupled with the hospitality server and configured to cause the one or more security credentials to be distributed; and a security credentials server coupled with the property server and configured to generate the one or more security credentials and release the one or more security credentials to be distributed to the user device.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
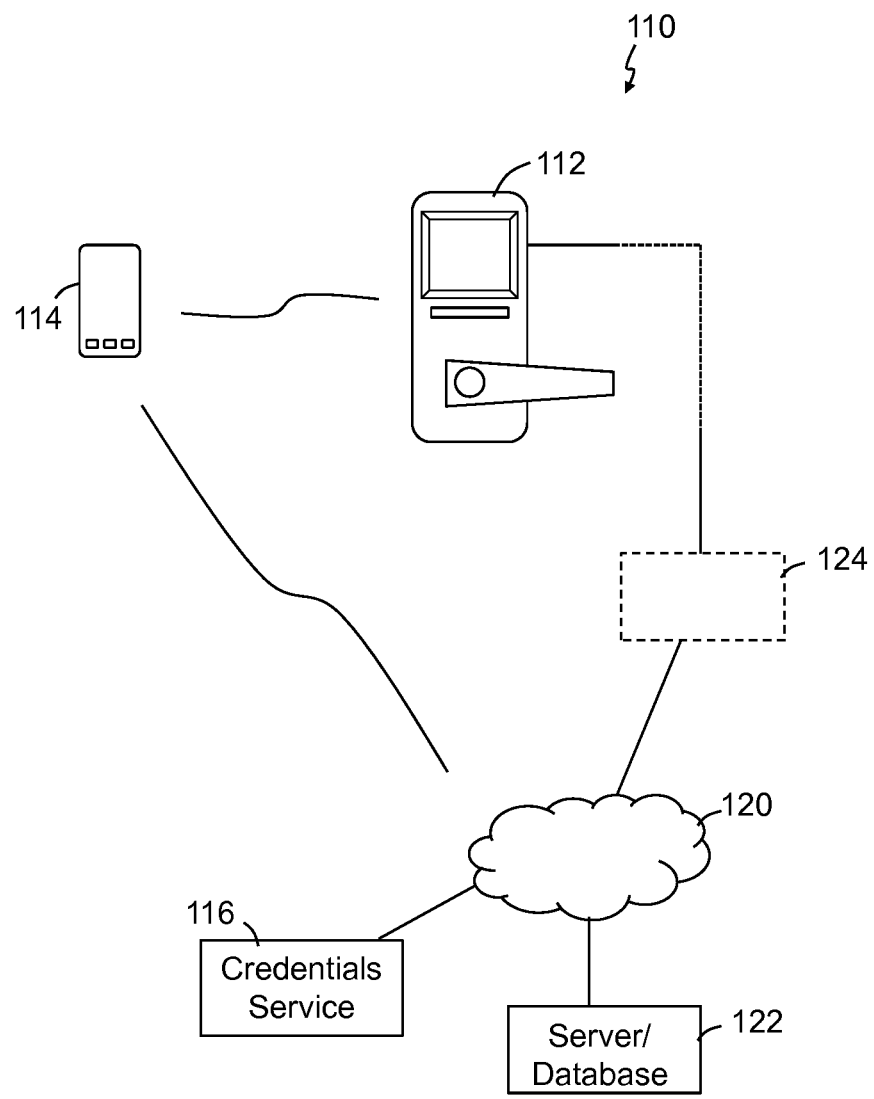
FIG. 1 depicts a simplified block diagram of an exemplary system configured to allow a guest to gain access to her/his room at a hotel, resort or other such property, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The hospitality industry continues to try to provide guests and/or customers with additional and/or better service, as well as trying to make things more convenient. Some embodiments provide comfort and/or convenience through self-service options. Further, some embodiments provide services and/or convenience through services and/or applications accessible through and/or implemented on a guests' portable consumer electronic user devices, such as smartphones, tablets and the like. For example, services are available through a mobile user device to allow a user to make a reservation and/or check-in to a guest room at a hotel, resort and/or other such property. Still further, some embodiments allow a user to acquire security credentials on a portable user device that acts as a key to a guest room at a property or otherwise allows a user access to their room. Additionally, some embodiments enable guests at a property to use their smartphone to unlock a door of their guest room. In some instances, this can allow a user to avoid needing to obtain a traditional physical key or key card from the front desk and use the key card with a door lock system to access the guest's room.

FIG. 1 depicts a simplified block diagram of an exemplary system 110 configured to allow a guest to gain access to her/his room at a hotel, resort or other such property, in accordance with some embodiments. The system typically includes multiple door lock systems 112, portable user devices 114 (e.g., smartphone, tablet or the like), and one or more security credentials services or vendors 116 and/or sources typically accessible to the user device through one or more distributed communication and/or data networks 120 (e.g., local area network (LAN), wide area network (WAN), Internet, cellular, or other such networks or combinations of such networks). Further, the network can utilize wired and/or wireless communication. Some embodiments further include one or more servers and/or databases 122, such as but not limited to, hotel or property server(s) that in part service a website associated with one or more properties, user profile and/or account information servers and/or databases, credentials databases, reservation servers, and/or other such servers and/or databases.

A guest (sometimes referred to as user) utilizes their user device 114 to acquire one or more security credentials. In some embodiments, the user device accesses a server 122 (such as a hotel server, third party server (e.g., contracted with by the hotel), or other such server or service to acquire the credentials) that acquire credentials from a credential server or service 116, and/or directs the user device 114 to the credential service. In other embodiments, the user device directly accesses a credentials service 116. Typically, the security credentials are locally stored on the user device. In some implementations, the user device operates an application that aids a user in acquiring, using, storing and/or protecting the credentials.

A door lock system 112 is identified for the guest room reserved for, intended for and/or assigned to the guest. The credentials or corresponding credentials are communicated to the door lock system, which are evaluated in determining whether to unlock the door corresponding to the door locking system. In some embodiments, a property server 124, computer system, computer, other such system or combination of such systems and devices (which may be local to the property and in communication with the door lock systems at the property, or otherwise in communication with the door lock systems at the property) coordinates the identification of the door lock system 112, guest identification, user device identification and the like, and the distribution of the security credentials to the door lock system 112 and/or user device 114. Further, in some embodiments, the property server 124 generates and/or acquires the security credentials (e.g., from the credentials service 116 or activates a local system to generate or retrieve the one or more security credentials).

The door lock system 112 is configured to wirelessly receive one or more security credentials from the user device 114. The wireless communication can be via Bluetooth, Bluetooth Low Energy (BLE), infrared, WiFi, Radio Frequency (RF), Z-wave, cellular or other such wireless communication protocols. Typically, in many embodiments, the door lock system 112 is configured to receive low power wireless communication within a limited range.

Further, in many embodiments, the door lock system 112 is configured to acquire one or more security credential or different security credentials from one or more other sources in addition to the user device 114. For example, in some embodiments, the door lock system 112 includes a key card reader that is configured to acquire one or more security credentials from a physical key card. The card reader can be a magnetic stripe reader, a radio frequency identifier (RFID) card reader or other such near field communication (NFC) reader, an optical scanner or reader (e.g., bar code reader), or the like. For example, the door lock system may include a radio frequency identifier (RFID) reader configured to receive wireless communications from an RFID key card (e.g., a card that emits Mifare Classic and/or Ultralight security credentials). As such, the door lock system 112 can be activated, in at least some embodiments, to open the door using a key card or the user device 114.

Upon receiving the one or more security credentials, the door lock system 112 is configured to verify that the security credential is associated with the door lock system and/or the corresponding room. In some embodiments, the door locking system locally receives one or more security credentials that are the same as or correspond with the one or more security credentials acquired by the guest through her/his user device 114 and/or as stored or otherwise programmed on a key card, key fob or other such device. In other embodiments, the door lock system may communicate the security credential received from the user device 114 to one or more computers, servers or the like (e.g., local property server 124) to verify the security credentials received from the user device correspond with the guest room.

Figure 2:
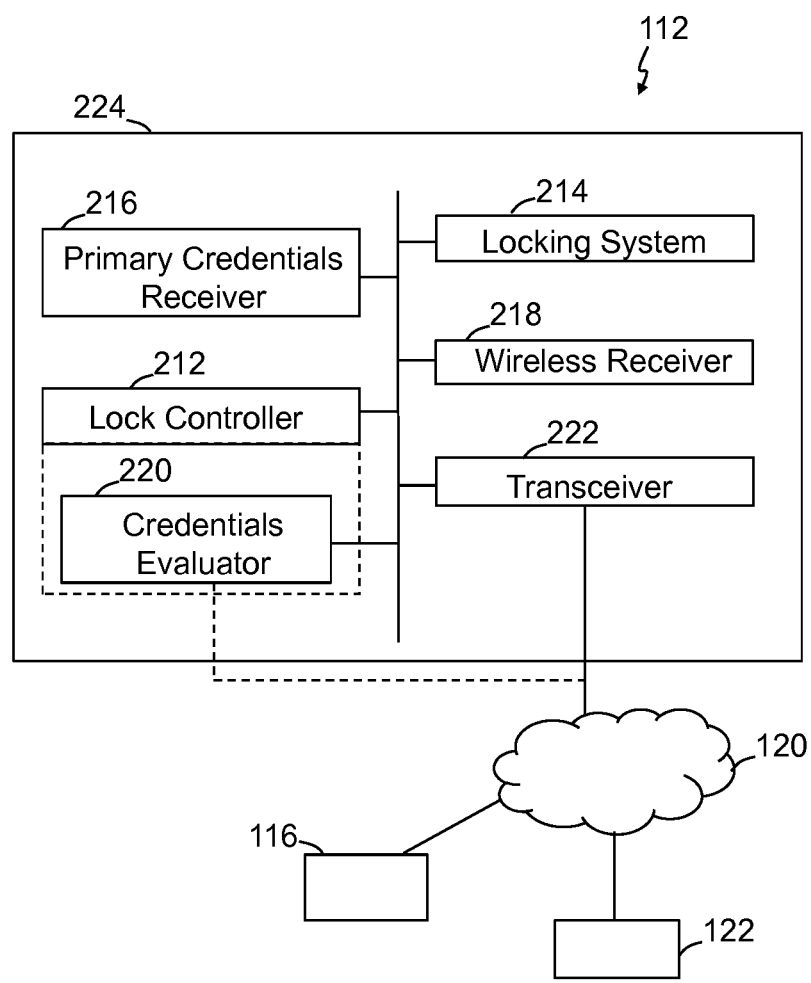
FIG. 2 shows a simplified block diagram of an exemplary door lock system, in accordance with some embodiments.

FIG. 2 shows a simplified block diagram of an exemplary door lock system 112, in accordance with some embodiments. In some implementations, the door lock system 112 includes a lock controller 212, a lock system 214, a primary security credentials receiver or reader 216, a wireless receiver and/or transceiver 218, a credentials evaluator 220 and a network transceiver 222. The lock controller 212 is configured to control the lock system 214, which comprises the electromechanical locking mechanism that locks and unlocks the door latch and/or door lever or handle to allow the latch to be retracted and the door to be opened.

The door lock system 112, in some embodiments, includes the primary credentials receiver or reader 216 that is communicationally coupled with the lock controller 212, and in some implementations the credentials evaluator 220. As introduced above, many door lock systems are configured to obtain primary security credentials from a physical key card, key fob, or other such primary credentials source. The key card may include a magnetic stripe, RFID circuitry or tag, or the like that at least temporarily record the security credentials. The primary credentials receiver is configured to obtain the primary security credentials from the key card. According, in some embodiments, the primary credentials receiver 216 comprises a magnetic stripe reader that reads the security credentials from a magnetic stripe of a key card (e.g., the primary credentials receiver is positioned proximate a card slot or guide so that a magnetic stripe on a key card is positioned to be accurately read). In other embodiments, the primary credentials reader comprises an RFID reader configured to wireless receive primary security credentials from an RFID enabled key card. In still other embodiments, the primary credentials reader may comprise an optical scanner or reader. Further, in many embodiments, the primary credentials receiver 216 is a magnetic stripe reader or RFID reader as is known in the art and operates consistent with those known readers. The primary credentials receiver 216 is configured to acquire one or more primary security credentials (which are received in a known and predefined format), and is further configured to forward some or all of the obtained one or more primary credentials to the credentials evaluator 220, to the lock controller 212 (which in some embodiments includes some or all of the credentials evaluator), to an external evaluator, or a combination thereof, to be evaluated.

The wireless receiver 218 is communicationally coupled with at least the lock controller 212. In operation, the wireless receiver is configured to wirelessly communicate with the user device 114 to receive the one or more security credentials. In some embodiments, the wireless receiver is a low power wireless receiver configured to wirelessly receive the one or more security credentials from the user device positioned proximate the wireless receiver 218. For example, in some embodiments, the wireless receiver 218 comprises a receiver that complies with Bluetooth, complies with Bluetooth Low Energy (BLE), complies with WiFi, complies with other such short range wireless communication protocols, or combination of such protocols.

In some embodiments, the proximity, distance and/or range of communication between the user device 114 and the wireless receiver 218 may be limited to less than about 20 feet, and in some instances less than approximately 5 feet. Further, the actual resulting range may depend on the power utilization of the wireless receiver 218 or other device embedded in the door lock system 112 and configured to communicate with the user device 114. Additionally, in some embodiments, the communication between the guest's mobile user device and the wireless receiver 218 in or cooperated with the door lock system is established based on the proximity. Further, some embodiments may determine a relative location of the user device relative to the wireless receiver (e.g., determining whether the user device is inside the room), and based on the determined location restrict and/or prevent activation of the door lock system.

Some embodiments optionally provide a unique identifier of the wireless receiver 218 and/or the door lock system 112 to the mobile user device as additional information along with or separate from the security credentials. This identification can be used by the user device 114 in determining whether to transmit the security credentials and/or by the wireless receiver in confirming a communication is intended for that wireless receiver. For example, in some implementations the mobile user device 114 receives a communication from the wireless receiver 218 of the door lock system and based on that unique identifier transmits the one or more security credentials upon confirming the identifier received from the wireless receiver is consistent with the identifier received by the user device accompanying the security credentials.

In many embodiments, the security credentials are substantially the same as or identical to the primary security credentials that would be expected from a physical key card read by the primary credentials receiver. For example, the security credentials received from the user device 114 contain the same information and/or are in the same format as would be received at the primary credentials receiver, and thus, can be supplied to the lock controller 212 and/or credentials evaluator 220 as if received from the primary credentials receiver. Accordingly, in some embodiments, the wireless receiver 218 operates as a broker leveraging already existing door lock credentials and security such that the security credentials received from the user device are evaluated and the guest's access is authenticated applying the same evaluation and against the same logic that is used in evaluating credentials received through the primary credentials receiver 216. This allows the wireless receiver 218 to emulate the primary credentials receiver 216. As one example, the primary credentials receiver 216 may comprise an RFID enabled card reader that is configured to wirelessly receive Mifare Classic and/or Ultralight security credentials; and the wireless receiver 218 can similarly be configured to wirelessly receive Mifare Classic and/or Ultralight security credentials wirelessly communicated from the user device 114.

Further, in some embodiments, the wireless receiver 218 is retrofitted into existing door lock systems 112. The wireless receiver operates with the existing door lock system, depending on the type of the door lock system (e.g., NFC, magnetic stripe, etc.), and act as a channel and/or broker to handoff the security credentials to the door lock controller 212 and/or credentials evaluator 220. As such, the wireless receiver 218 is configured, in some embodiments, to leverage existing door lock security credentials instead of creating a parallel path of authenticating the credentials and/or guest prior to opening the door lock. Additionally, in at least some embodiments, the retrofit does not need to include electronic integration of the wireless receiver 218 with the lock system 214, and instead merely communicationally couples the wireless receiver with the lock controller 212 and/or credentials evaluator 220. In some embodiments, the wireless receiver 218 couples with the lock controller 212 and/or credentials evaluator (e.g., the same inputs of the lock controller that the primary credentials receiver 216 couples to) such that the lock controller and/or credentials evaluator is unaware that the security credentials are received from the user device 114. Still further, in some embodiments, the door lock system 112 comprises a wireless transmitter, and/or the wireless receiver 218 is part of a wireless transceiver allowing bi-directionally communication with the user device 114. The format and speed at which credentials are communicated to the wireless receiver are often dependent on the receiver, size of credentials and/or other information in the communication, buffer size and/or other such criteria. In many embodiments, the wireless receiver 218 includes one or more buffers configured to receive the security credentials wirelessly transmitted by the mobile device, and in some instances, sufficiently larger to handle at least a full image of Mifare Classic (e.g., at least 4K).

The credentials evaluator 220 is communicationally coupled with the lock controller 212, or in some embodiments is partially or fully incorporated within the lock controller. The security credentials received through the primary credentials receiver 216 or the wireless receiver 218 are evaluated and/or authenticated. In some embodiments, the credentials evaluator has access to one or more base security credentials, and the received security credentials are compared to the base security credentials in determining whether to allow the locking system to unlock. For example, the credentials evaluator may receive the same security credentials as provided to the user device 114 and/or stored on a key card, and when the credentials match the access is authenticated. Once authenticated, the lock controller 212 can control the locking system to unlock or lock.

In some embodiments, the door lock system 112 includes a receiver or transceiver 222. The transceiver 222 is communicationally coupled with the lock controller 212 and may further provide a communication interface external to the door lock system, such as to a credentials service 116, a property server 124, other services or servers, or the like via a local or distributed network 120. This allows the lock controller and/or credentials evaluator to, for example, receive the base security credentials and/or other information for authenticating the security credentials from the user device 114, a key card or the like. In other embodiments, the credentials evaluator additionally or alternatively communicationally couples with one or more devices and/or services external to the door lock system 112.

Further, the door lock system 112 typically includes a housing 224. In some embodiments, the lock controller 212, credentials evaluator 220 and the transceiver 222 are incorporated within the housing. Further, in many embodiments, the wireless receiver 218 is incorporated into the housing. For example, in retrofitting existing door lock systems, the wireless receiver 218 can be added into a space within the housing that already includes the lock controller 212, primary credentials receiver 216 and credentials evaluator 220. In other embodiments, the door lock system 112 is originally assembled with the wireless receiver 218 in the housing 224. In still other embodiments, the receiver is cooperated with and exterior to the housing, and/or partially incorporated into the housing. The housing is typically configured to at least in part support the door lock system 112 and/or to secure or mount the door lock system when the door.

Figure 3:
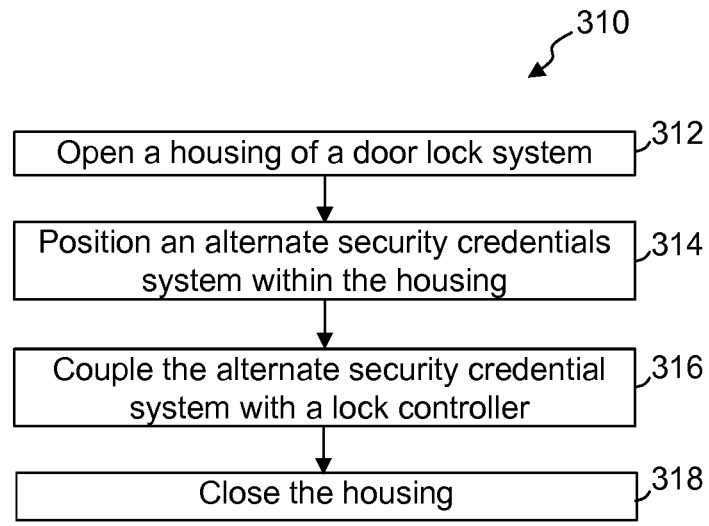
FIG. 3 shows a simplified flow diagram of an exemplary process of retrofitting a door lock system to include a wireless receiver/transceiver, in accordance with some embodiments.

FIG. 3 shows a simplified flow diagram of an exemplary process 310 of retrofitting a door lock system 112 to include the wireless receiver/transceiver 218, in accordance with some embodiments. In step 312, the housing 224 of an electromechanical door lock system 112 is opened and/or at least partially detached from a door. In step 314, a wireless receiver 218 or alternate security credentials system is positioned within the housing. As described above, in some embodiments the wireless receiver comprises a low power wireless receiver configured to wirelessly receive security credential wirelessly communicated from a portable consumer electronic user device. The user device stores the security credentials in local memory of the user device and wirelessly transmits the security credentials via low power transmission to be received by the wireless receiver 218 when the user device 114 is located proximate the door lock system 112 and the wireless receiver.

In step 316, the wireless receiver is communicationally coupled with a lock controller 212 of the door lock system. The wireless receiver is configured to forward the security credential received from the user device to the lock controller. In some embodiments, the wireless receiver acts as a relay to receive and forward the content of the received wireless communication. In other embodiments, the wireless receiver extracts and/or formats the content from the wireless communication. Typically, the security credentials received at the wireless receiver are substantially the same as the security credentials that would otherwise be received through the primary credentials receiver 216, such as acquired from a key card. In some embodiments, the wireless receiver communicates the security credential to the lock controller such that the lock controller is unaware that the security credential is received from the wireless receiver. Further, in some embodiments, one or more inputs of the lock controller are identified that the primary credentials reader is already coupled with to supply credentials to the lock controller, and the wireless receive is coupled with those one or more inputs of the lock controller. Additionally, in some embodiments the wireless receiver is positioned within the housing and coupled with the lock controller so that wireless receiver does not interfere with an acquisition of primary security credentials by the primary credentials reader and the communication of the primary security credentials to the lock controller. In step 318, the housing of the door lock system is closed such that the lock controller and the wireless receiver are positioned within the housing.

Figure 4:
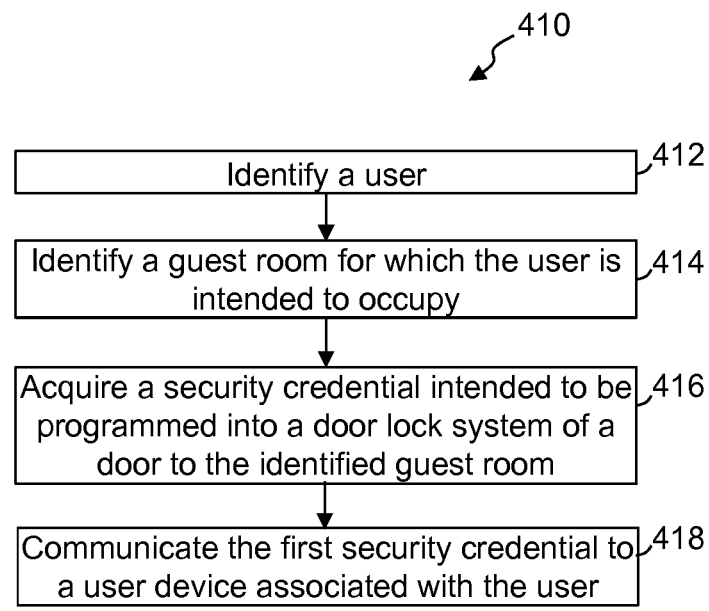
FIG. 4 illustrated a simplified flow diagram of an exemplary process of issuing and/or distributing security credentials or other such electronic key (E-Key) to a portable user device, in accordance with some embodiments.

FIG. 4 illustrated a simplified flow diagram of an exemplary process 410 of issuing and/or distributing security credentials or other such electronic keys (E-Key) to a portable user device 114, in accordance with some embodiments. In step 412, a guest is identified. In some embodiments, the user has accessed a user account, user profile or the like through one or more log-in procedures. For example, the user may have remotely accessed a user account service via the Internet 120 using her/his user device 114, a laptop, a computer or other such device. In other embodiments, an employee of a collection of properties (e.g., a hotel company), or an employee at a specific property may have accessed a user's account, generated a user's account, reserved a room for a user, registered or check-in a user or the like.

In step 414, a guest room is identified that is reserved for the user and for which the user is assigned to occupy. This room may have been previously selected by the user or an employee associated with the property, or selected by an automated process based on the guest preferences and stored at least in association with the user account or profile, a user may select the room as part of a registration and/or check-in process (e.g., using their mobile user device 114 accessing a hotel service via the Internet), an employee may select the room (e.g., during a check-in procedure), a computer application and/or service may select or may have previously selected the room for the user, or the like. For example, the user in making a reservation may have accessed a service from over the Internet (e.g., a website associated with the hotel), reserved a room, and selected a desired room (e.g., from a listing or mapping of potentially available rooms, which usually match one or more user selected criteria (e.g., dates of stay, bed size, number of beds, floor level, proximity to amenities, or the like, and typically combinations of such criteria)).

In step 416, one or more security credentials are acquired that are to be used by the user to unlock the door lock system and gain access to the room. In many embodiments, this includes accessing a credentials service, application or the like that generates or selects the one or more credentials in response to a request and/or check-in. For example, a user may be accessing a service 122 over the distributed network 120 through a mobile application or APP on the user device 114, through a web browser and internet site associated with the property, or the like. The service may include software to generate and/or access a database of security credentials. In other embodiments, the service may communicate with a security credentials service and/or vendor 116 that generates and/or retrieves the one or more security credentials. The assignment of the security credentials typically also includes associating the credentials with the identified guest room, and typically exclusively associating the credentials with the identified room, and in some instances the duration of the stay. The credentials may be created to be valid for the duration of the guest's stay at the property. In some embodiments, the selected or generated security credentials may also be forwarded to the door lock system.

Further, in many embodiments, a request for one or more security credentials is communicated (e.g., over a distributed network) to a security credentials service. The request may further include and/or a subsequent communication may provide (e.g., in response to a request from the security credentials service) information identifying a door lock system and/or a type of door lock system associated with the guest room. This allows the credential service, at least in part, to identify a type of security credential to be supplied so that one or more supplied security credentials are consistent with a format of security credentials received through a primary credentials receiver 216 of the door lock system 112.

In step 418, the one or more security credentials are communicated to the user device 114. Typically, the user device is identified, authenticated and/or confirmed to be associated with the user prior to the credentials being forwarded. For example, the user device may have to communicate identification information of the user device to the service such that the service can confirm the user device is associated with a user account and/or profile. The user may additionally or alternatively have to enter security information through the user device (e.g., password, user name, personal identification number (PIN), or other such information, or combinations of such information) that is communicated back to the service 122 prior to the service communicating the credentials as part of an authentication process, or other such confirmation or combinations of such confirmations. In some embodiments, an application or APP is implemented on the user device 114 that at least in part establishes the communication and/or secure communication between the user device and the security credentials service 116 and/or hotel, guest or other such server or service 122. This APP, in some implementations, is configured to provide authentication information to the security credentials service or vendor 116 as part of communication exchanges between the user device and/or APP and the security credentials service 116 in distributing the security credentials to the user device 114.

Further, some embodiments enhance security by providing the user device 114 with an identification of the door lock system 112 for which the security credentials are intended to unlock. For example, the credentials service 116 and/or property server 124 can identify the door lock system 112 on the door to the room assigned and/or selected by the user. A unique identifier associated with the door lock system and/or the wireless receiver 218 can be obtained (e.g., from a database of identifiers) and communicated to the user device with or separate from the security credentials. The user device can then use this unique identifier, at least in part, as a confirmation that the security credentials are being communicated to the correct wireless receiver and door lock system. Still further, some embodiments apply security to some or all of the wireless communications. In some embodiments, information transmitted (e.g., security credentials) are encrypted applying algorithms designated by and/or used by the credentials service 116, property server 124 and/or other lock vendor server software. For example, when the security credentials are provided consistent with RFID key cards, encryption can be based on Mifare Classic protocol. The encryption keys used are typically unique to the door lock system and can be interpreted only by the door lock system for which the credentials are created.

In some implementations, multiple different security credentials can be simultaneously valid for a single door lock system. This can be similar to the scenario where multiple guests are in the same room and each of them has a key card. Typically, each key card has unique credentials and is active throughout the entire stay. Accordingly, in some embodiments, multiple security credentials can be distributed to different user devices 114 that are valid at the same time and each can be used independently to unlock the same door lock system. Further, in some implementations security credentials are generated by a vendor key lock server (e.g., the credentials service 116, the property server 124 or the like) every time a request for credentials is made, e.g., multiple requests for different user devices associated with a single room.

Further security is provided in some embodiments through a user profile and/or log-in. A guest often has a profile and the guest is validated using their unique user identifier (e.g., number, user name, or the like, or combinations of such) and typically a password. In some implementation, the log-in is achieved through a mobile application activated on the user device 114. Once authenticated the guest can access and/or retrieve relevant information (e.g., reservation information). Additional business validations may be done in an attempt to further ensure that the guest and the reservation are eligible to receive and use the one or more security credentials through the user device. For example, in some implementations a hotel service and/or server accessed over the Internet confirms the guest identification through a log-in process and confirms the user is authorized for remote check-in (e.g., through the guest's user device 114, computer or other such device) and/or to use the security credentials through the user device (e.g., use electronic key credentials). Still further, some embodiments authenticate the user device 114. For example, a guest logged into her/his account can register one or more user devices 114 so that the user device(s) is associated with the guest. Upon requesting the security credentials, the credentials service and/or property server can limit distribution of credentials to the one or more authenticated and/or registered user devices.

Some embodiments apply further security on the user device 114. In some implementations, the one or more security credentials are encrypted at the time of generation by the credentials service 116 and/or property server 124 and maintained in an encrypted form on the user device. Additionally, in some embodiments application level security is applied to restrict access to the credentials to only the relevant mobile application on the user device that implements the retrieval and communication of the credentials, and secures the credentials from being accessed by other applications or API installed on the mobile user device or communicating with the user device.

In some embodiments, security is applied when communicating at least the security credentials between the user device 114 and the wireless receiver 218. In some implementations, a user device has a unique identification of the wireless receiver and/or the door lock system and confirms this identification before wirelessly communicating the credentials to the wireless receiver. Further, as described above, some embodiments apply encryption prior to communicating the credentials from the user device and/or the credentials are received at the user device in an encrypted state and maintained and wirelessly communicated in the encrypted state. The encryption keys used can be unique to the wireless receiver 218 and/or door lock system 112, and typically can be interpreted only by the wireless receiver and/or door lock system for which the credentials are created.

In some implementations, the security credentials are communicated to a credentials distribution service maintained and/or operated by the hotel, a hotel chain, a third party or the like. Further, in some instances, the security credentials may be communicated to the door lock system 112 on the door to the identified guest room. The communication may be directly from the security credentials service or vendor 116, from or through a local computer or server at the property, or the like. Still further, in some embodiments, the security credentials are not distributed to the mobile user device until it is confirmed that the room is available and/or vacant (e.g., previous guest has been checked out). Similarly, in some instances, the security credentials are not distributed to a credentials distribution service, the door lock system, or other system until it is confirmed that the room is available and/or vacant. This can avoid preventing a guest currently in the selected room from being able to continue to access the room, while preventing the identified guest from being able to gain access to the room. Some embodiment, in acquiring the security credentials in step 416 further include confirming that the room is actually available prior to acquiring the security credentials. In other implementations, step 416 may not be entered until it is confirmed in step 414 that the room is available. In other implementations, however, the identified user may be obtaining the security credentials prior to the room actually being available (e.g., the user is performing an early check-in, while a current guest is still in the room but anticipated to be departing and freeing up the room by the time the room is to be made available to the user). As such, in some implementations, the credentials may not be authorized at the door lock system and/or communicated in step 418 until it is determined the room is available. In some instances, the user is notified that the selected room is not available and/or the security credentials are invalid and will not work.

Still further, the security credentials may also be communicated to a key card programming system at the property. This allows one or more key cards to be programmed at the property that can be used by the guest in addition to or alternatively to using the mobile user device 114. The communication of the security credentials to the key card programming system is often similar to processes that are currently being used in the hotel industry. In some embodiments, however, the key card programming system may further be configured to locally program and/or distribute the security credentials to the user device 114 or one or more secondary user devices (e.g., spouse's smartphone).

Figure 5:
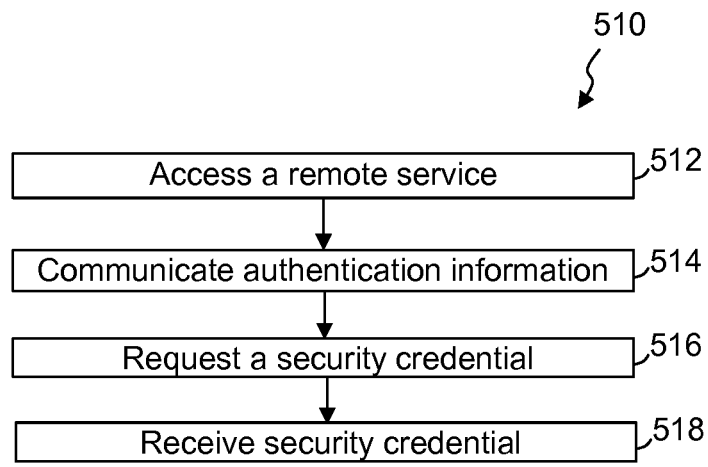
FIG. 5 illustrated a simplified flow diagram of an exemplary process of acquiring one or more security credentials or other such electronic key (E-Key) through a user device that will allow a user to gain access to a guest room, in accordance with some embodiments.

FIG. 5 illustrated a simplified flow diagram of an exemplary process 510 of acquiring one or more security credentials or other such electronic keys (E-Key) through a user device 114 that will allow a user to gain access to a guest room, in accordance with some embodiments. In step 512, a remote service is accessed through the portable consumer electronic user device 114 and over the distributed network 120. In many embodiments, the access to the service is implemented through a mobile application executed on the user device. The mobile application in part established communication with the remote service and controls options available to the user through the user device in acquiring the security credential.

In step 514, authentication information is communicated from the user device to the remote service. The authentication information can be substantially any relevant information. For example, the user may access and/or log into a user account through the mobile application. In some embodiments, the remote service or another service or server maintains multiple user accounts corresponding with many different users. The authentication information may be provided during the log-in such that the remote service confirms the user accessing the user account. Additionally or alternatively, authentication information of the mobile user device may be provided to the service. This can be used, in some embodiments, to confirm the user device requesting the security credential is associated with the user.

In step 516, a request is submitted to the remote source for one or more security credentials. In some embodiments, the mobile application displays a user interface that includes one or more options. One option can include an option to initiate the retrieval of the security credential. For example, some embodiments provide a user with an option to implement a "Straight to Room" option, which allows a user to bypass having to go to the front desk to get a key card, and instead initiates the process 510 of acquiring the one or more security credential that can be stored on the user device 114 to gain access to the guest room. Similarly, in some embodiments, the mobile application displays on the user device a check-in interface and the option to initiate the retrieval of the one or more security credentials may be displayed as an option to acquire an electronic key as part of the check-in interface and/or a check-in process implemented through the mobile application. Accordingly, in some embodiments, the mobile application, in response to detecting a selection of the option, requests the one or more security credentials (e.g., requesting the security credentials for the door to the guest room corresponding to a reservation associated with the user account). In step 518, the one or more security credentials are received at the user device 114. Further, in some embodiments, the one or more security credentials are stored locally within the user device to be later wirelessly communicated by the user device to the door lock system to gain access to the guest room when the security credential is verified by the door lock system.

Figure 6:
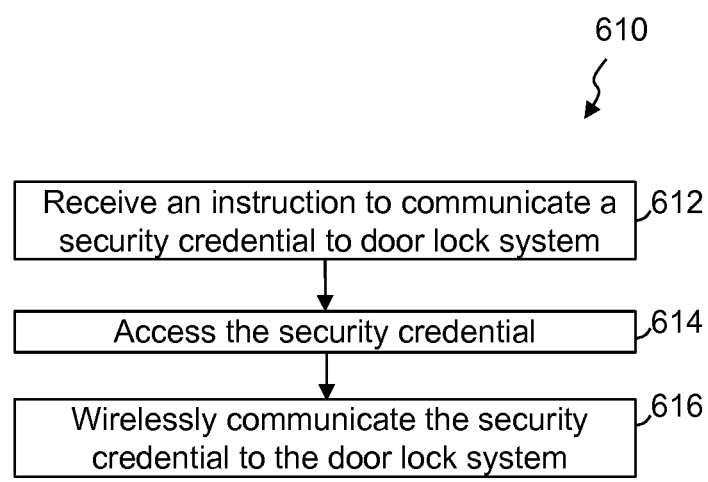
FIG. 6 illustrated a simplified flow diagram of an exemplary process implemented by a portable consumer electronic user device in communicating one or more security credentials to a door lock system and allowing a user to gain access to the guest room, in accordance with some embodiments.

FIG. 6 illustrated a simplified flow diagram of an exemplary process 610 implemented by a portable consumer electronic user device 114 in communicating one or more security credentials to a door lock system 112 and allowing a user to gain access to the guest room, in accordance with some embodiments. In step 612, the user device 114 receives an instruction to communicate one or more security credentials to a door lock system 112 that is configured to unlock a lock of the door lock system on a door to a guest room that is reserved for the user if the one or more security credentials are verified. In some embodiments, one or both of the user device 114 and/or the wireless receiver 218 detect that the other device is within wireless range. Once in range the user device can initiate a process to unlock the door lock system. As introduced above, in some implementations a unique identifier of the wireless receiver and/or door lock system can be used with and/or in addition to the proximity based communications, which in part provides some security. In many implementations, the initiation of the unlocking process is initiated by the guest. For example, the guest may activate a mobile application on the user device and select an option to initiate a process to unlock the door (e.g., one or both of the user device and wireless receiver can confirm identification of the other, transmission of one or more security credentials, etc.). In some implementations, the option can be selected by pressing an icon, sliding a bar, or the like displayed on a touchscreen of the user device.

Further, the mobile application may be the same or a different application that the guest uses to access property services (e.g., a hotel website), perform an early or remote check-in, acquire the one or more security credentials, etc. In some embodiments, the mobile application is configured and/or programmed in a modularized fashion where certain types and/or pieces of functionality are made available and/or active depending on current conditions and/or states. For example, the application in some implementations may enabled some functionality and/or features after confirming the guest, property, reservation, etc. are eligible for that functionality. As a specific example, if a hotel is not equipped with door lock systems that include or are retro-fitted to wirelessly communicate with the user device, then the mobile application would automatically hide and/or disable the functionally and/or option of allowing the user to have security credentials delivered to the user device. The mobile application, in some embodiments, further provides the user with feedback and/or status information (e.g., providing some visual indicator to show that the credentials have been received and are ready for use). Further, the application may include steps where the guest is to perform an action (e.g., slide or touch a button, etc.) to initiate the communications and validation workflows.

In some embodiments, the user device 114 and/or wireless receiver 218 establish and/or acknowledge each other before the credentials are communicated. Further, some embodiments utilize the BLE as the standard communication between the user device 114 and the door lock system 112, with a BLE stack built into the user device platform (e.g., iOS, Android and/or other such platforms). Further, the initiating communication and/or initial handshaking can be handled through the BLE stack of the mobile operating system. Additionally in some implementations, a mobile application on the user device 114 can be configured to confirm through an application program interface (e.g., a BLE API) that the communication has been established before transmitting the credentials.

In step 614, the user device accesses the one or more security credentials. Typically, the security credentials are previously received and stored local on the user device. In some embodiments, the user device 114 retrieve the credentials via wireless communication (e.g., cellular, WiFi, etc.), and in some instances may retrieve the credentials at the time of usage. Typically, however, the credentials are retrieved prior to intended use, which can reduce latency and/or performance delay, avoid poor signal quality (e.g., poor signal or network in a hallway). In many embodiments, the credentials are downloaded and store on the user device 114 in response to a room being assigned to a guest and/or the guest checking in, which in some instances may be at a time the user arrives at a property, a few hours before the guest arrives at the property, or even one or more days before the user is expected to arrive.

In some embodiment, the user device 114 and/or a mobile application operating on the user device stores information regarding one or more reservations associated with the corresponding guest (e.g., each reservation is uniquely identified and filed in the mobile application). Further, each reservation will have a unique room number assigned (assuming a room has been assigned; however, in many instances a reservation may not have a room assigned for a reservation associated with a future date), and each room number will have its own key credentials. In many implementations, two rooms will not have the same guest security credentials.

Further, some embodiments provide a user interface displayed on the user device 114 (e.g., through the mobile application) that distinguishes between rooms (e.g., will have a clear indication of the room number), and distinct credentials will be associated with each room. Further, in many implementations, a credential (or a single set of credentials intended to be used together) and/or the mobile application using the credential can open one room at the time. The visual display may be configured to show a visual display of the room number at the time of transmitting the credential. The visual display may further provide information to the user, such as an indication that the credentials were communicated, whether the door lock system 112 is unlocked (e.g., based on a reply from the door lock system), an indication of a duration the door will be unlocked, an indication of a countdown of the duration (e.g., a user may slide an icon, slide bar, or the like to initiate transmission of the credentials, the slide bar or a portion of the slide bar may change colors indicating the unlocking (e.g., green), and the slide bar may gradually transition back to a start point showing the countdown of the duration until the lock re-locks).

In some instances, a credential (or set of credentials) automatically expires, such as when a guest checks out, on the day of the guest is scheduled to depart, or the like. Additionally or alternatively, some embodiments distribute (e.g., via a cellular communication) one or more push notifications that are sent to the mobile user device 114 to cause the user device to delete the credential and/or cause the credential to expire. This push notification can be implemented, for example, when the credentials have to be refreshed (in a scenario of room changes), upon check out, or the like. Further, the old credentials will automatically be removed and/or expire in response to the refresh.

In step 616, the one or more security credentials are wirelessly communicated to the door lock system to be verified by the door lock system. Further, in some embodiments, the user device confirms an identification of the wireless receiver 218 and/or the door lock system 112. For example, in some implementations the wireless receiver transmits an identifier of the wireless receiver and/or the door lock system. The user device can compare the identification with a locally stored identification. Accordingly, the user device (e.g., through the implementation of a mobile application configured to allow the user device to acquire and/or use the security credentials) communicates the one or more security codes when the identification received from the wireless receiver corresponds with and/or matches the identification information the user device previously received (e.g., from the credentials service 116, property server 124, etc.). In many implementations, a confirmation is sent from the wireless receiver or other transmitting device back to the mobile user device 114. Some embodiments limit and/or apply restrictions on communications back to the user device as such communications may have additional implications on the power consumption by the wireless receiver 218 and/or door lock system 112.

Figure 7:
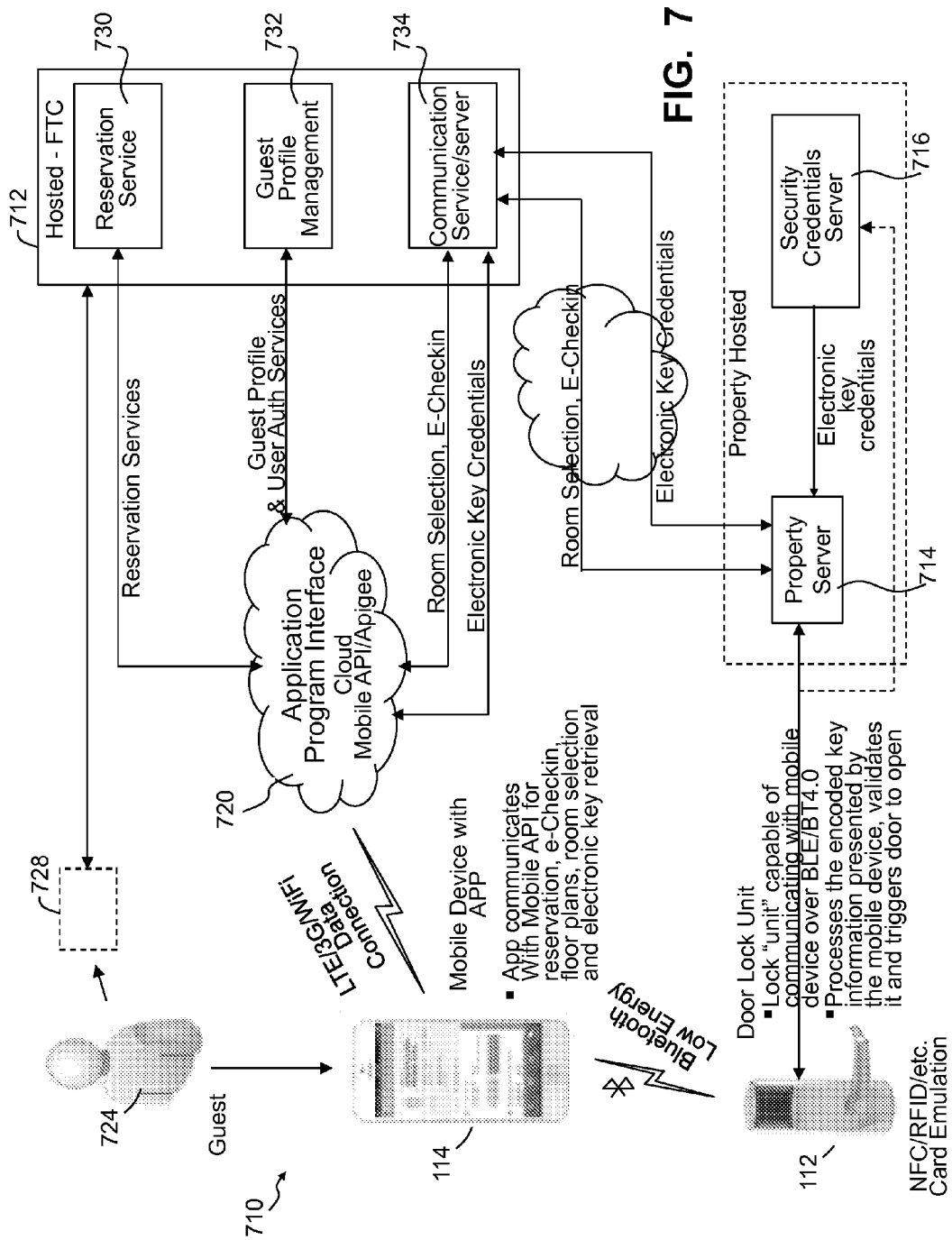
FIG. 7 illustrates a simplified block diagram of exemplary electronic key distribution apparatus configured to provide a guest with access to features, conveniences and/or options associated with one or more properties having guest spaces to be occupied by guests, in accordance with some embodiments.

FIG. 7 illustrates a simplified block diagram of an exemplary electronic key distribution apparatus 710 configured to provide a guest (sometimes referred to as a user) with access to features, conveniences and/or options associated with one or more properties having guest spaces (e.g., rooms, apartments, condominiums, vacation rental properties, houses, offices, etc.) to be occupied by guests, in accordance with some embodiments. In some embodiments, the system includes network accessible hospitality server or service 712, one and typically multiple property systems or servers 714, a security credentials service or server 716, an application program interface (API) 720, and multiple door lock systems 112.

The hospitality service 712 provides functionality to a hospitality company, such as a company owning and/or operating one or more hotel properties, resorts, or other locations that have rooms, houses, offices or other such locations for guests 724 to occupy. Typically, the hospitality service 712 is implemented on one or more computers, servers, databases and the like, and typically on multiple computers, servers and databases that are geographically distributed and cooperatively operated, such as over the Internet. In some embodiment, the hospitality service 712 includes and/or provides a reservation service 730, a guest profile management and authorization and/or authentication service 732, and a guest interface service 734.

The application program interface 720 provides an interface between the user device 114 (and typically the mobile application implemented on the user device) and the hospitality service 712. The application program interface 720 is typically implemented through one or more servers, computers, databases and the like cooperatively operated and distributed over a distributed network, such as the Internet. In some embodiments, the application program interface 720 is partially or fully implemented on one or more of the computers, servers and the like that implement the hospitality service 712. Further, in some embodiments, the mobile application implemented on the user device is configured to facilitate an exchange of relevant information to and/or from the user device, and in some implementations display a user interface.

The property server 714, in some embodiments, provides functionality specific to a given property and may be similar to or the same as the property server 124. For example, the property server 714 may maintain reservations specific to a given property, costs and/or charges accumulated by guests at the property, room assignments at a given property and other such information. In some embodiments, the security credentials server 716 may be the same as the credentials service 116, or may be an extension of the credentials service 116. For example, in some implementations, a security credentials server 716 is operated at each property and generates and/or distributes security credentials to an associated property. Accordingly, in some embodiments, the property server 714 and the security credentials server 716 are property hosted. In other embodiments, the security credentials server 716 is an interface to the credentials service 116, which is remote from and typically geographically distributed on multiple servers, computers, databases, etc. that at least partially cooperate.

The guest 724 is capable of accessing at least some of the functionality and/or features provided through the system 710 through the portable user device 114. In some embodiments, the guest is further capable of accessing at least some of the functionality and/or features of the system through a computer 728 or other such device.

In some implementations, the hospitality service 712 allows guests, utilizing the mobile application operated on the mobile user device 114, to access the reservation service 730 to check for availability at one or more properties and make reservations. Further, the guest can similarly access check-in services provided at least in part through the guest interface service 734. In some embodiments, the mobile application on the user device 114 communicates with and/or through the application program interface 720 to allow the guest to perform a remote check-in or e-Checkin, where the guest can activate a reservation, check a floor plan of the relevant hotel, select a room of choice, other such features or combinations of such features. In some embodiments, property server 714 facilitates the processes of room selection and e-Checkin (e.g., by providing relevant property information, such as available rooms, maps, etc.). Similarly, the guest interface service 734 communicates with property server 714 to supply reservation, reselection, check-in and/or other such information.

Furthermore, the mobile application, in some embodiments, provides the guest with the ability to obtain one or more security credentials for a selected and/or assigned room. For example, the mobile application may provide the guest with an option to initiate a "Straight to Room" or front desk bypass process where the mobile application retrieves the one or more security credentials (or electronic key(s)) for a selected or assigned room corresponding to the guest's reservation and/or modifications made to the reservation at the time of check-in. In some embodiments, the property server 714 communicates with the security credentials server 716 to create and/or obtain unique security credentials for the door lock system 112 of the selected room. Further, the property server 714 can communicate the relevant encoded one or more security credentials to the user device 114, for example, through the application program interface 720 and/or the guest interface service 734. In some embodiments, the mobile application can be configured to verify whether the door lock system has unlocked and/or whether the room has been opened, and log that information. Additionally or alternatively, the user device 114 may communicate the log information and/or whether the door lock system unlocked to the hospitality service 712, a database or the like. Accordingly, the mobile application and/or application program interface 720 can be configured to allow the tracking of usage of the credentials.

Similarly, in some implementations, the property server 714, the security credentials server 716 or other computer system communicates the one or more security credentials to the relevant door lock system 112. As such, the door lock system is capable of evaluating security credentials received through the primary credentials receiver 216 (e.g., RFID, magnetic stripe, etc.) and/or wirelessly from the mobile user device 114 through the wireless receiver 218.

In some embodiments, the door lock system includes the wireless receiver that communicates with the portable user device as the only security credentials receiver. Accordingly, the door lock system does not include an RFID security credential reader, a magnetic stripe credential reader or other such readers.

Figure 8:
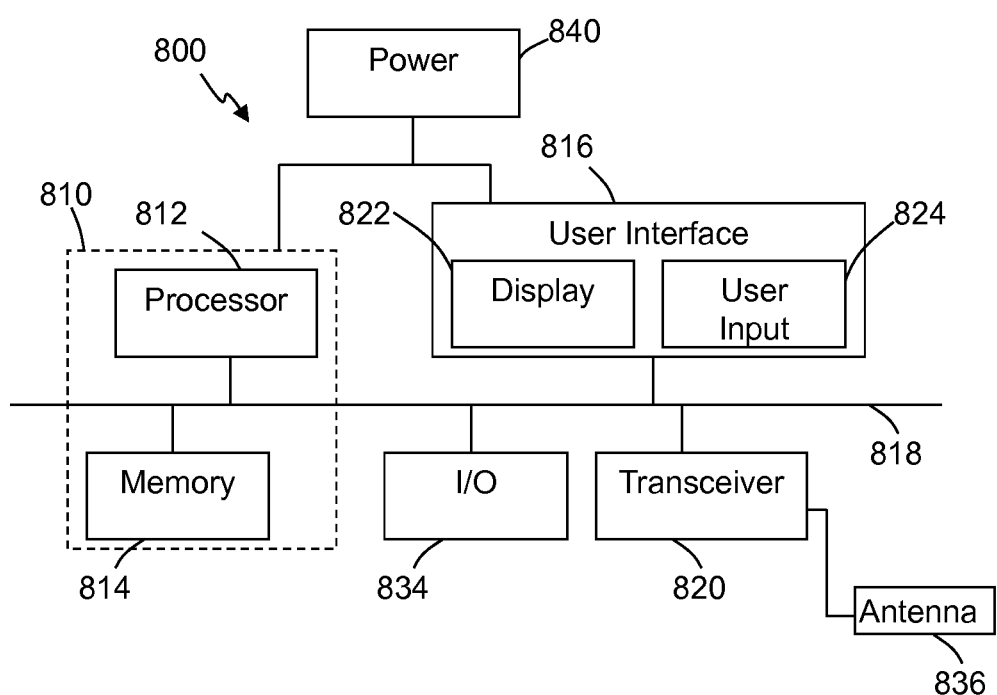
FIG. 8 illustrates an exemplary system for use in implementing methods, techniques, devices, apparatuses, systems, servers, sources and the like in allow a guest to distribute, obtain and use security credentials through a mobile user device to unlock a door in accordance with some embodiments.

The methods, techniques, systems, devices, services, servers, sources and the like described herein may be utilized, implemented and/or run on many different types of devices and/or systems. Referring to FIG. 8, there is illustrated an exemplary system 800 that may be used for any such implementations, in accordance with some embodiments. One or more components of the system 800 may be used for implementing any system, apparatus, circuitry, or device mentioned above or below, or parts of such systems, apparatuses, circuitry or devices, such as for example any of the above or below mentioned door lock systems 112, mobile user device 114, credentials service 116, servers and/or databases 122, property server 124, lock controller 212, primary credentials receiver 216, wireless receiver 218, credentials evaluator 220, transceiver 222, hospitality service 712, property server 714, security credentials server 716 and the like. However, the use of the system 800 or any portion thereof is certainly not required.

By way of example, the system 800 may comprise a controller or processor module 812, memory 814, a user interface 816, and one or more communication links, paths, buses or the like 818. A power source or supply 840 is included or coupled with the system 800. The controller 812 can be implemented through one or more processors, microprocessors, central processing unit, logic, local digital storage, firmware and/or other control hardware and/or software, and may be used to execute or assist in executing the steps of the processes, methods and techniques described herein, and control various communications, programs, content, listings, services, interfaces, etc. Further, in some embodiments, the controller 812 can be part of a control system 810 and/or implemented through one or more processors with access to and/or include one or more memory 814. The user interface 816 can allow a user to interact with the system 800 and receive information through the system. In some instances, the user interface 816 includes a display 822 and/or one or more user inputs 824, such as a buttons, touch screen, keyboard, remote control, mouse, track ball, etc., which can be part of or wired or wirelessly coupled with the system 800.

Typically, the system 800 further includes one or more communication interfaces, ports, transceivers 820 and the like allowing the system 800 to communication over a communication bus, a distributed network, a local network, the Internet, communication link 818, other networks or communication channels with other devices and/or other such communications or combinations thereof. Further the transceiver 820 can be configured for wired, wireless, optical, fiber optical cable or other such communication configurations or combinations of such communications.

The system 800 comprises an example of a control and/or processor-based system with the controller 812. Again, the controller 812 can be implemented through one or more processors, controllers, central processing units, logic, software and the like. Further, in some implementations the controller 812 may provide multiprocessor functionality.

The memory 814, which can be accessed by the controller 812, typically includes one or more processor readable and/or computer readable media accessed by at least the controller 812, and can include volatile and/or nonvolatile media, such as RAM, ROM, EEPROM, flash memory and/or other memory technology. Further, the memory 814 is shown as internal to the system 810; however, the memory 814 can be internal, external or a combination of internal and external memory. Similarly, some or all of the memory 814 can be internal, external or a combination of internal and external memory of the controller 812. The external memory can be substantially any relevant memory such as, but not limited to, one or more of flash memory secure digital (SD) card, universal serial bus (USB) stick or drive, other memory cards, hard drive and other such memory or combinations of such memory. The memory 814 can store code, software, executables, scripts, security credentials, data, content, programming, programs, log or history data, user information and the like.

One or more of the embodiments, methods, processes, approaches, and/or techniques described above or below may be implemented in one or more computer programs executable by a processor-based system. By way of example, such a processor based system may comprise the processor based system 800, a smartphone, a tablet, a computer, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for distributing, acquiring, using, and receiving security credentials. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use in providing a guest with security credentials to gain access to a guest room with a computer simulation, the one or more computer programs configured to cause a computer and/or processor based system to execute steps comprising: identifying a user; identifying a guest room of multiple guests rooms at a property and with which the user is intended to occupy; acquiring a first security credential intended to be programmed into a door lock system of a door to the identified guest room; and communicating, over a distributed network, the first security credential to a portable consumer electronic user device associated with the user to be stored on the smartphone such that the smartphone is configured to wirelessly communicate the first security credential to the door lock system to gain access to the guest room.

Other embodiments provide one or more computer-readable storage mediums storing one or more computer programs configured for use in allowing a user to gain access to a guest room, the one or more computer programs configured to cause a computer and/or processor based system to execute steps comprising: accessing, from a portable consumer electronic user device communicating over a distributed network, a remote service; communicating, through the user device, authentication information to the remote service; requesting a security credential configured to be communicated by the user device to a door lock system of the guest room to allow a user to gain access to the guest room; and receiving, at the user device and from the remote service, a security credential and storing within the user device the security credential configured to be wirelessly communicated by the user device to the door lock system to gain access to the guest room when the security credential is verified by the door lock system.

Figure 9:
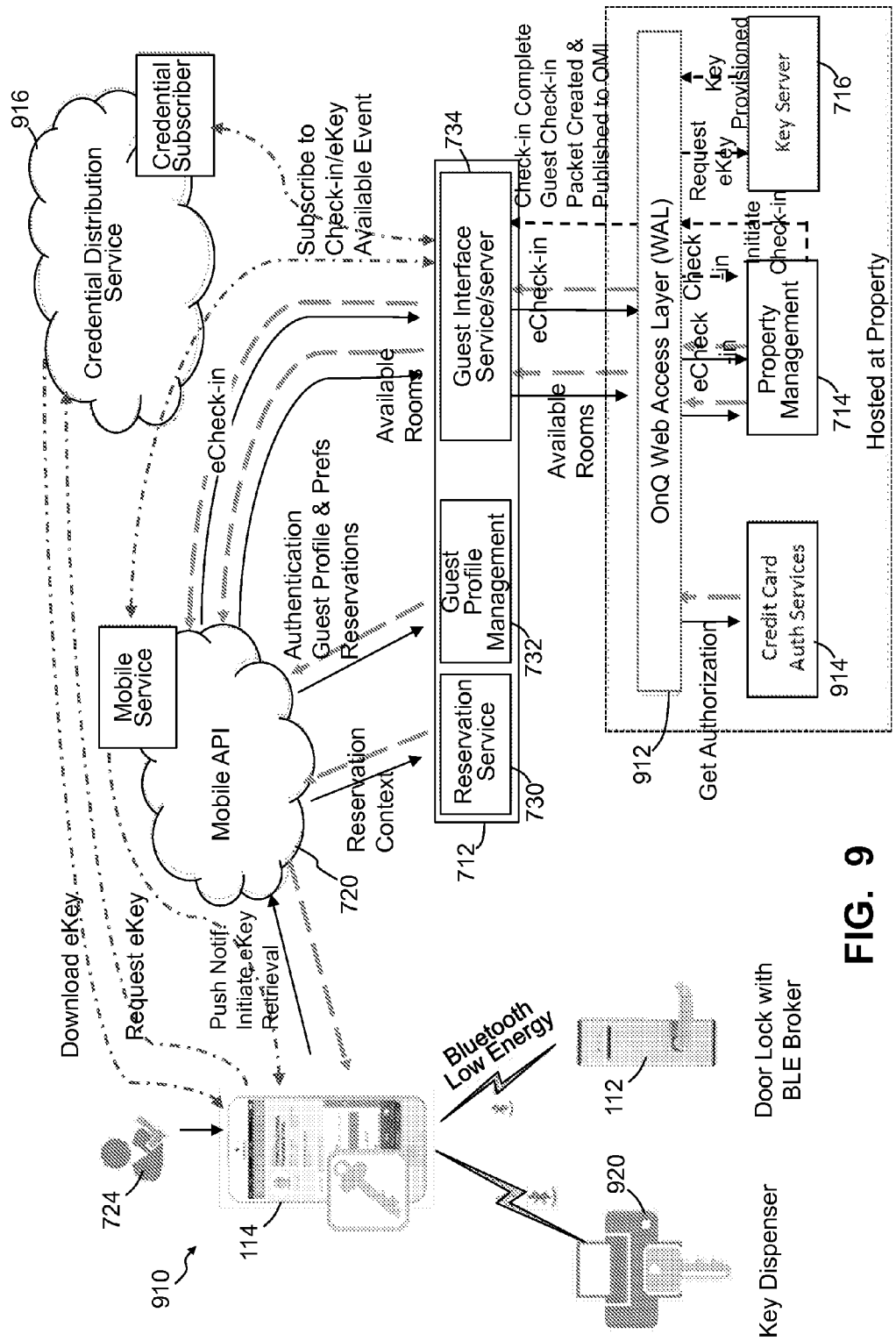
FIG. 9 illustrates a simplified block diagram of an exemplary electronic key distribution system, in accordance with some embodiments.

FIG. 9 illustrates a simplified block diagram of an exemplary electronic key distribution system 910, in accordance with some embodiments. The electronic key distribution system 910 is configured to provide a guest (sometimes referred to as a user) with access to features, conveniences and/or options associated with one or more properties having guest spaces (e.g., rooms, apartments, condominiums, vacation rental properties, houses, offices, etc.) to be occupied by guests. In some embodiments, the system includes network accessible hospitality server or service 712, one or more property systems or servers 714, a security credentials service or server 716, an application program interface (API) 720, and multiple door lock systems 112.

The hospitality service 712 provides functionality to a hospitality company, such as a company owning and/or operating one or more hotel properties, resorts, or other locations that have rooms, houses, offices or other such locations for guests 724 to occupy. Typically, the hospitality service 712 is implemented on one or more computers, servers, databases and the like, and typically on multiple computers, servers and databases that are geographically distributed and cooperatively operated, such as over the Internet. In some embodiment, the hospitality service 712 includes and/or provides a reservation service 730, a guest profile management service 732, and a guest interface service 734 (sometimes referred to as a communication service or server).

Some embodiments further include a network access layer (NAL) 912 that provides an interface between the reservation service 730, the guest profile management service 732, and the guest interface service 734. Further, some embodiments include a payment service and/or authentication 914, such as a credit card authentication service. In some implementations, the key distribution system 910 operates similar to the key distribution system 710 of FIG. 7 in at least some respects, such as in identifying a user or guest 724, allowing the guest to check-in, and acquiring electronic key and/or security credentials. The guest interface service 734, however, typically does not distribute the electronic security credentials to the mobile user device 114. Instead, in some embodiments, the guest interface service 734 cooperates with a credentials distribution service 916 that can distribute the security credentials. In some embodiments, the credential distribution service is separate from the property, hotel, hotel chain and the like, providing a buffer and/or added security.

For example, the guest 724 can initiate communication, through the user device 114 to initiate the acquisition of security credentials. In many instances, this includes initiating a check-in with the property, through the application program interface 720. The request is forwarded to the guest interface service 734 of the relevant property of interest and/or for which the guest has a reservation. The guest is authenticated and security credentials are generated through the security credentials server 716, which in turn forward the security credentials to the guest interface service 734. In some implementations, the guest interface service forwards the security credentials along with corresponding access and/or authentication information to the credentials distribution service 916, while further sending a notification through the application program interface 720 the guest's user device 114. For example, in some implementations, the application program interface 720 generates a push notification that the security credentials are available through the credentials distribution service 916.

In response, the user device 114 can communicate a request to the credentials distribution service 916 for the security credentials to the lock 112. In some instances, the request can be automatically initiated by the user device 114, while in other instances the guest has to initiate the request. The request typically includes authentication information and/or a series of communications between the user device and the credentials distribution service authenticating the user device and/or the user, which may require the guest 724 to enter information, such as a password, confirmation, or the like). The credentials distribution service 916 then distributes the credentials to the user device 114, which is used by the user device in unlocking the door lock system 112.

Figure 10:
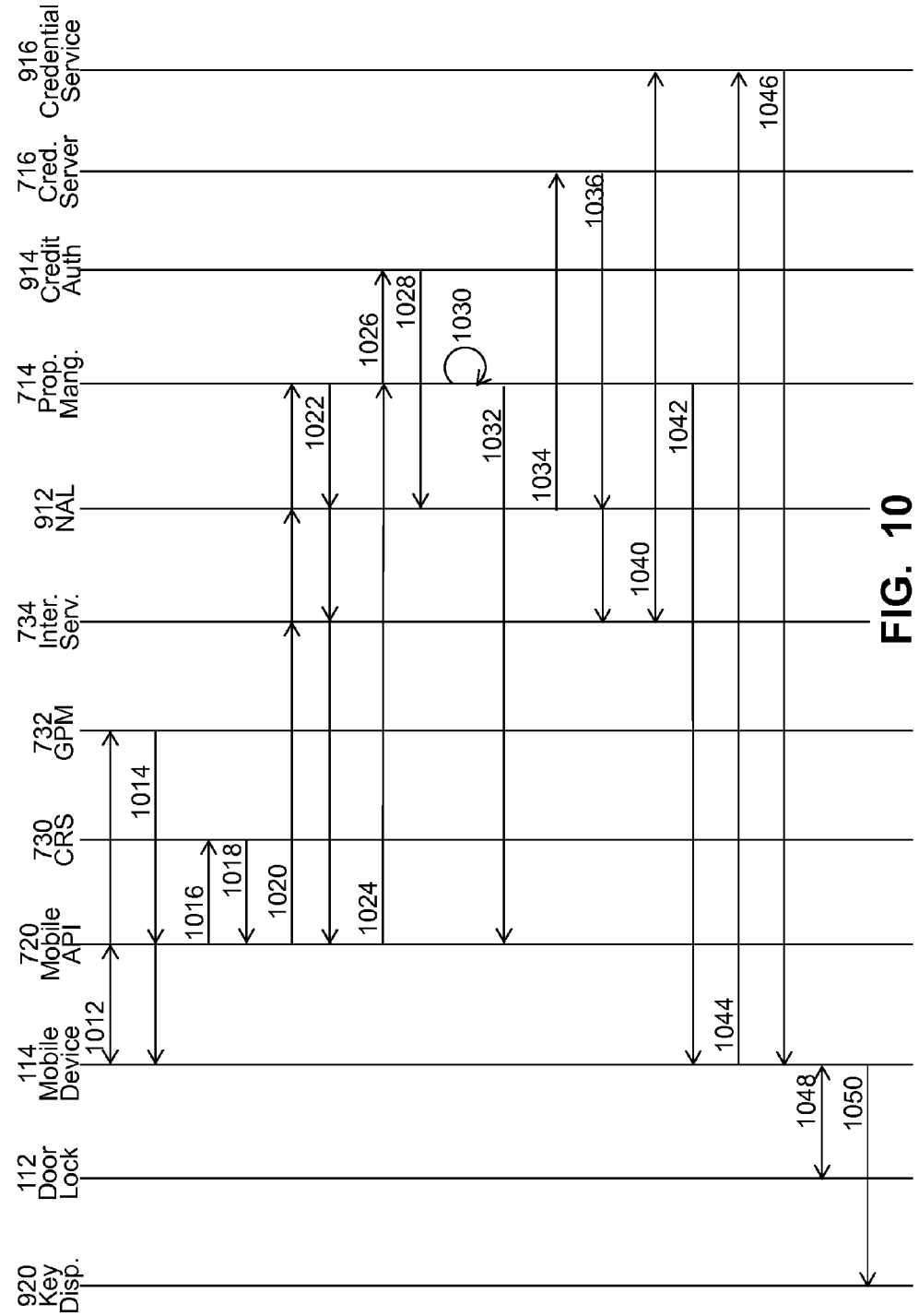
FIG. 10 shows a simplified exemplary process of illustrating communications between components of the key distribution system of FIG. 9 in distributing security credentials, in accordance with some embodiments.

FIG. 10 shows a simplified exemplary process 1010 of illustrating communications between components of the key distribution system 910 of FIG. 9 in distributing security credentials to a user device 114, in accordance with some embodiments. Referring to FIGS. 9 and 10, in step 1012, a guest 724 initiates a log-in to the property service to initiate an electronic check-in and acquire door lock security credentials. In some embodiments, the guest activates an APP on her/his mobile user device 114. The communication typically includes a communication through the application program interface 720 to a guest management service 732. In some embodiments, the guest management service maintains a database of records and/or profile information for multiple if not all guests that have stayed at the property and/or a property associated with the guest management service. The profile information can include guest preferences, locations stayed, pending reservation information, and other such information. In step 1014, the profile management service 732 allows the user to log-in to a current account and/or profile.

In step 1016, the guest further accesses a reservation service 730 and/or is directed to the reservation service to access the relevant pending reservation. Again, the reservation service can maintain reservation information for multiple guests at one or more properties, and typically hundreds or more properties. It is noted that a reservation is not required. Instead, the check-in process can be implemented even when the guest does not have a reservation. In step 1018, the guest is provide information to populate through the APP the relevant reservation information to allow the guest to confirm the reservation information, and in some instances update reservation, preferences and/or other information. In some embodiments, the user interface displayed through the APP (e.g., as part of the reservation confirmation information) includes a check-in option that can be selected by the user. In step 1020, the check-in process is activated where the user device 114 communicates through the application program interface 720 to the guest interface service 734 that identifies the relevant property that the guest is trying to check into and routes the check-in request to the relevant property system or network. For example, in some embodiments, the property system may be operated at property maintaining relevant records, such as currently available rooms, guest information for guests at the property, expected and/or previously stayed at the property, status information (e.g., cleaning status, room features (what floor is that room on; does it have a king bed; does it have a view; etc.), and/or other such information).

The check-in request can include a request for available rooms. In some embodiments, the property system includes a property management server or service 714 that identifies available rooms that correspond to the pending reservation and/or consistent with a request being initially submitted. Further, in some embodiments, the property management server uses guest preferences to identify potential rooms that are relevant to the guest's reservation and preferences (e.g., guest is a premium member so limit rooms to an executive floor; guest likes to be far from elevator; guest likes to be at a lower floor; guest likes to have a view; guest wants a king bed; guest wants a non-smoking room; etc.). In step 1022, the property management server 714 can then send a reply identifying one or more available rooms that correspond with and/or most closely match the reservation and guest preferences. It is noted that the available room list may not expressly be limited to the reservation criteria, but instead may identify one or more potential upgraded rooms for which the guest may be willing to pay additional costs. In other embodiments, the property management server may simply specify the room the guest is assigned. Typically, however, the guest is offered the listing of available rooms to choose from. Further, the available room reply can include and/or cause the APP to display a map of the hotel and/or property, and typically designates one or more of the available rooms. This can allow the guest to review the potential rooms with knowledge of its relative position on the property and/or with respect to other features, amenities and aspects of the property.

In some implementations, the guest can manipulate the map to zoom in (e.g., through a pinch method on a touch screen, the selection of an option, etc.), rotate the map (particularly when a three dimensional mapping is included of a room layout), access additional or alternative mapping and the like. Further, the identification of potentially available rooms may include color coded dots boarding and the like indicating availability, unavailable, upgrades, and/or other such information. Further, text may be provided, such as describing amenities and/or benefits of a room, which may be displayed or only displayed when selected, a point in hovered over a representation of a room, a text option is selected or the like.

In step 1024, the APP returns a room selection in response to the guest selecting an available room and/or confirming a room assignment. The selection is forwarded to the property management server 714 to record and continue the check-in procedure in accordance with the designated room. Some embodiments include step 1026, where the property management system can further initiate a payment verification and/or authentication. Typically, a credit card authentication is performed through the credit card authentication service 914, and the authentication provided to the property management server in step 1028.

In step 1030, the property management server 714 or other server typically further evaluates one or more criteria in confirming the selected room is ready for the guest. This can include confirming the previous guest has checked-out, that housekeeping has finished with the room, the credit card is validated and/or other such confirmations. In some implementations, the property management may implement a request queue that allows the property management system to automatically and repeatedly monitor the criteria. In some implementations when the room is not ready, the check-in process is halted and the guest is notified. In other instances, the guest may be notified that the check-in is completed and/or the selected room is being held for the guest but that security credentials for the door look (sometimes referred to as eKey) cannot be issued because the room is not yet ready or available. This may further allow the guest to select a different room if desired. Again, in step 1032, the guest is typically notified of the check-in.

In step 1034 the security credentials server 716 (sometimes referred to as a key server) is activated, such as through an eKey request from the property management server, to generate relevant electronic security credentials. As indicated above, in some implementations, such communications are implemented through a network access layer 912. Again, in some embodiments, the security credentials server is located at the property. In step 1036, the security credentials server issues the security credentials. Further, the security credentials are typically incorporated within a communication packet to enhance security of the security credentials. Further protection schemes may be applied such as but not limited to encryption. In step 1040, the guest interface service 734 routes the security credentials to the credentials distribution service 916, which holds the security credentials safe until requested by the guest.

In step 1042, the property management server 714 and/or application program interface 720 notify the guest through the user device 114 that the security credentials are available to be retrieved. In some embodiments, the API includes a mobile service that generates a push notification requesting that the guest initiate an eKey retrieval from the credentials distribution service 916. Further, in some instances the mobile service knows and/or determines appropriate communication protocols (e.g., by identifying a type of user device). Still further, the notification may include additional information such as authentication criteria, encryption keys, passwords or codes, and/or other such information to allow the user device to acquire the security credentials from the credentials distribution service 916. In step 1044, an eKey retrieval is activated, typically through a user selecting an option displayed through the user interface of the APP on the user device 114. This retrieval process typically includes direct communication between the user device 114 and the credentials distribution service 916, such as through the Internet, a cellular communication, or other such communication. Again, the communication may include encryption keys, authentication criteria, passwords and/or other such security measures. In response, in step 1046, the credentials distribution service 916 distributes the security credentials. Again, authentication and/or encryption is typically employed prior to and in the communication of the security credentials.

The user device 114 locally stores the security credentials. In some embodiments the APP applies additional security procedures to the stored security credentials. In step 1048, the guest 724 can then use the security credentials in unlocking the door lock system 112, which are typically packaged into a wireless communication packet with added security and/or authentication. For example, the guest may use the same APP or a different APP and select an option to open the door lock system. In some embodiments, the door lock system 112 includes a wireless communication receiver (e.g., Bluetooth radio) that communicates with the user device. Further, the door lock system may include a communications broker that receives the communication packet and can confirm the security and extract the security credentials to be forwarded to the lock controller 212 and/or credentials evaluator 220. Still further, in some implementations there is one or more communication exchanges between the user device 114 and the door lock system 112.

In some embodiments, the wireless communication system of the door lock system 112 broadcasts a limited range beacon or other such notification that can be detected by the user device 114 (e.g., limited to between 0-6 feet or less). Further, the user device may be configured and/or controlled through the APP and/or other software to acquire the beacon before trying to communicate with a door lock system. Still further, in some embodiments, the beacon is specific to the mobile device so that the mobile device responds just to the appropriate door lock system and not to one or more neighboring door locks and/or other door lock systems as the user device is carried down a hallway. Some embodiments include the use of additional authentications or other such security that prevents the user device from communicating with an incorrect door lock system. Again, the communication between the user device 114 and the door lock system 112 may include encryption and/or other security for the communication exclusively between the lock and the specific mobile device. Similarly, some embodiments utilize communication certificates to establish a pairing between the user device 114 and the door lock system 112.

The communication of the security credentials can be incorporated into one or more packets. The packet can include more than just the security credentials, and in some instances includes additional certificates, which in part may limit the ability of the user device to communicate with the specific door lock system. The broker, lock controller 212 and/or credentials evaluator 220 of the door lock system obtains the security credentials from the communication packet or packets and confirms the security credentials before triggering the lock system 214 to unlock.

Some embodiments additionally include a key dispenser 920 (see FIG. 9). The guest may utilize the user device 114 to communicate with the key dispenser 920 to obtain a physical key card that can be used in some door lock systems. For example, in step 1050, the user device can communicate with the key dispenser 920 in response to an activation by the user (e.g., through a selection of a key card option in the APP) including the security credentials. In response, the key dispenser can code a key card, key fob or other such relevant device that can be used with a door lock system. In some implementations, the communication between the user device 114 and the key dispenser is similar to the communication between the door lock system and the user device. This can include the key dispenser may issue a beacon that can be detected by the user device. In other instances, however, the user device may wirelessly communicate a beacon that is detected by the key dispenser. Information to be included in and/or the packet formatting of the beacon may be provided to the user device, for example, with the push notification that the security credentials are available, or some additional communication. The key dispenser can operate, in part, similar to the door lock system and confirm the security credentials, and typically confirm an association of the security credentials with at least the user device 114. Further security measures may be included, such as a guest entering in a password, a room number, additional or alternative encryption, additional or alternative credentials or other such security measures, or combinations of such measures. Accordingly, the key dispenser 920 can be operated by the guest independent of a hotel employee to acquire one or more key cards, key fobs or the like (e.g., for one or more family members).

Figure 11:
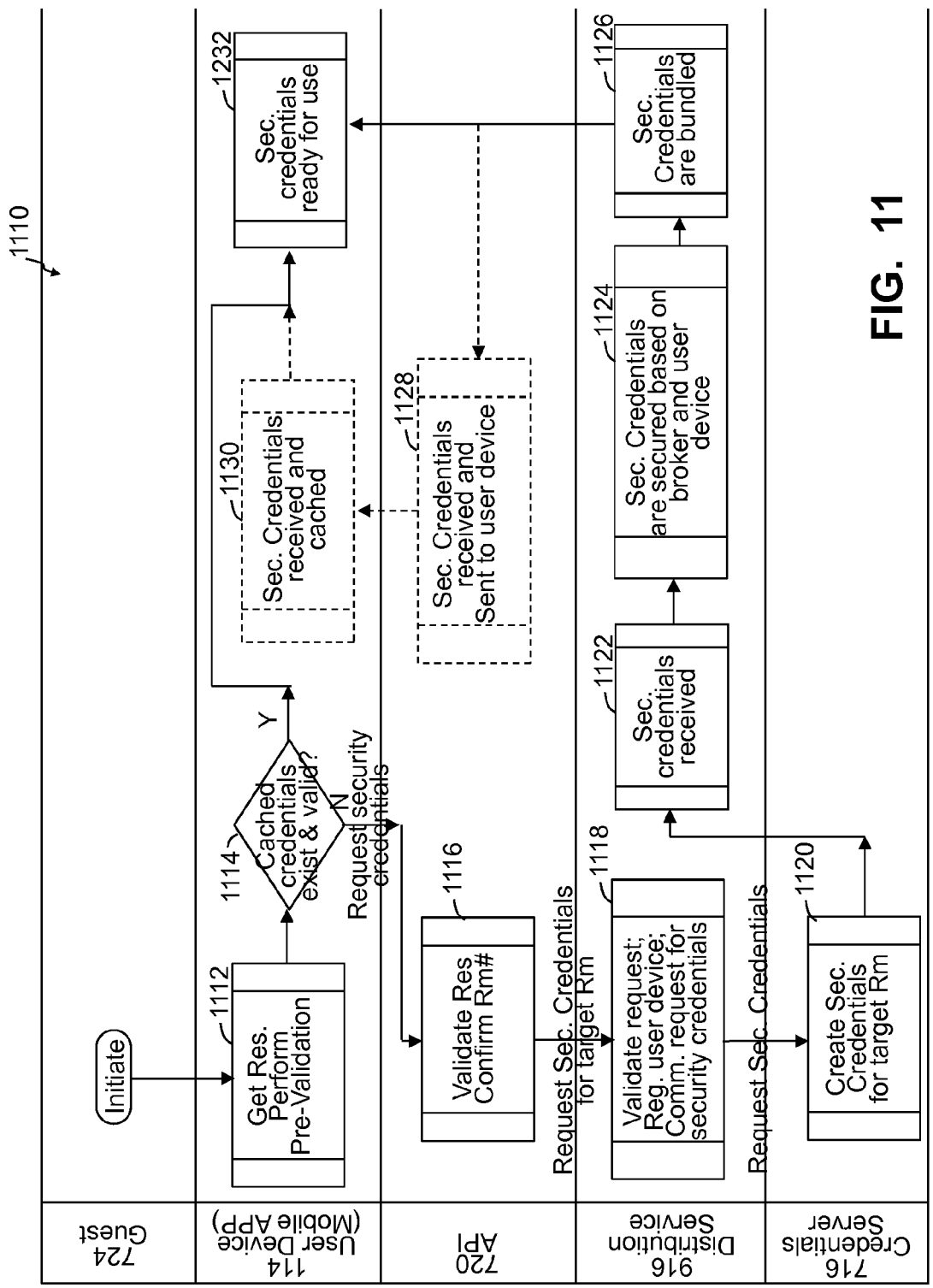
FIG. 11 shows a simplified exemplary process of illustrating communications between components of a key distribution system in distributing security credentials, in accordance with some embodiments.

FIG. 11 shows a simplified exemplary process 1110 of illustrating communications between components of a key distribution system (e.g., one or more of key distribution systems 110, 710 and/or 910 of FIGS. 1, 7 and 9, respectively) in distributing security credentials to a user device 114, in accordance with some embodiments. A guest initiates the acquisition of security credentials that can be utilized through the guest's user device 114. For example, in step 1112, the APP on the user device 114 obtains relevant reservation information maintained on the user device and/or readily accessible (e.g., from the reservation service 730). In step 1114, the APP can determine whether security credentials have already been obtained, are cached on the user device and/or are still valid. In those instances where valid credentials are not stored on the user device, security credentials are requested.

Some embodiments include step 1116 where the application program interface 720 validates the reservation request, typically through the reservation service 730, and can confirm one or more room numbers that correspond with and/or have been associated with the relevant reservation. In some embodiments, this includes obtaining a relevant room number that is assigned to the guest, which may include some or all of the process 1010 of FIG. 10. Based on the assigned room, a request is sent to the security credentials server for the security credentials. Further, in some instances, the credentials distribution service 916, in step 1118, validates a request from the user device for the security credentials. The credentials distribution service may further register the user device 114, and identify a relevant lock vendor and/or lock type associated with the assigned room. In some embodiments, the credential distribution service may communicate a request that the security credentials be created, forwarded and/or refreshed. In step 1120, the security credentials server 716 generates and/or obtains the security credentials upon validation of the reservation and corresponding guest.

In step 1122 the credentials distribution service 916 receives the security credentials. In step 1124, the credentials distribution service packages and/or saves the security credentials. In packaging the security credentials, in some embodiments, the credentials distribution service secures the security credentials based on a determined lock type, broker within the lock and/or the user device (e.g., type and/or manufacturer of the user device). In step 1126, the security credentials are configured and prepared to communication, such as bundling, encrypting and the like, and transferred to the user device 114. In some embodiments, the security credentials are optionally passed in steps 1128 and 1130 through the application program interface 720 to the user device. In step 1132, the user device securely stores the security credentials for subsequent use.

Figure 12:
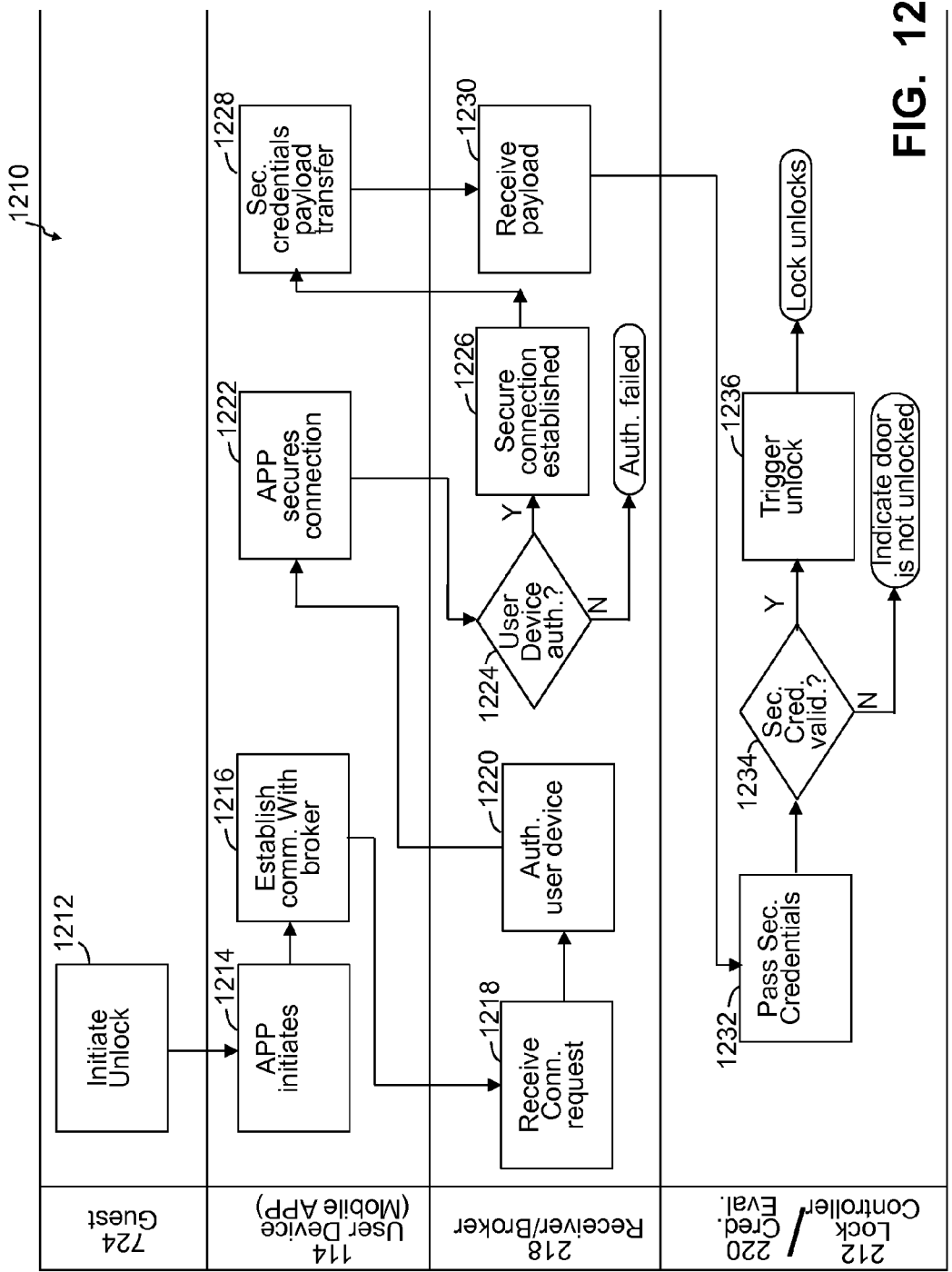
FIG. 12 shows a simplified exemplary process of illustrating communications between a user device and a door lock system, in accordance with some embodiments.

FIG. 12 shows a simplified exemplary process 1210 of illustrating communications between the user device 114 and the door lock system 112, in accordance with some embodiments. In step 1212, a guest initiates an unlocking of the door. In step 1214, the user device (e.g., through the APP) initiates an unlock process or sequence. This can include a verification of the communication connection between the user device and the door lock system (e.g., verifying BLE enabled connection). In step 1216, a communication is established between the APP and the receiver 218 and/or broker of the door lock system (e.g., initiating a hand shake process between the user device and the target broker of the target lock system).

In step 1218, the broker receives the connection request. In step 1220, confirms the communication connection (e.g., confirming the hand shake) and challenges the user device to authenticate itself. In step 1222, the user device, typically through the APP, responds to the challenge and secures the connection. In step 1224, the device authentication fails when the user device cannot be authenticated. Alternatively, when authenticated, a secure connection is established between the receiver 218 and the user device 114 in step 1226. In step 1228, the user device communicates the security credentials to the broker, which may extract relevant information and forward the security credentials to the lock controller 212 and/or credentials evaluator 220, or may simply forward the communications allowing the lock controller 212 and/or credentials evaluator 220 to obtain the security credentials.

In step 1232, the lock controller 212 and/or credentials evaluator 220 evaluates the security credentials. In step 1234 it is determined whether the security credentials are valid. When invalid the lock is not triggered to unlock. In some instances an indication is provided (e.g., visual, audio, or other such indication or combination of such indication) that the lock was not unlocked. Alternatively, in step 1236 the lock is triggered to unlock when the security credentials are validated, which may also include an indication that the lock was unlocked (e.g., a different visual, audio, or other such indication or combination of such indication).

Some embodiments provide guests with greater ease of access to her/his room. Further, a hotel or company can provide its guests enhanced comfort and convenience by allowing the guests to use their personal, portable user devices (e.g., smartphone, cellular phone, tablet, etc.) to supply security credentials to their door lock systems. Further, some embodiments provide gests enhanced comfort and convenience by allowing the use of self-service options on their portable user devices 114 for various functions, features and on-property activities, including check-in and/or security credential (or key) acquisition. Allowing guests to use their personal smartphones and/or other portable user devices at least in part reduced or eliminates the need for a guest to obtain a traditional physical guest room key card from the property's front desk, use that key card to unlock and/or lock the guest room door lock system, and/or return the key card to the property's front desk upon the guest's departure.

Further, some embodiments reduce or eliminate a need for the guests to carry and locate the key card. Given the usual high use and close proximity of guests with their mobile user devices, providing guests with capability to use their user devices to unlock doors reduces the incidence of key cards being lost by guests and the resulting additional activities on the part of both the guest and the property staff to create and/or obtain a replacement. Further, it can reduce or eliminate the need to generate such key cards, freeing up staff for other activities, reducing costs (costs for the cards, the card machines, maintenance on the card machines, etc.).

Some embodiments further leverage existing door lock credentials instead of creating a parallel path of authenticating the guest prior to opening the door lock. Further, some embodiments reduce and/or ease maintenance, at least in part, by simplifying provisioning and maintenance of credentials, and processes are in line with existing operating procedures. Some embodiments further do not require electronic integration in at least the lock system 214, and/or do not have to integrate with the lock components electronically. Still further, some embodiments simplify installation, at least in part by avoiding integration with the locking system and/or applying different security credentials, which would result in added and/or alternative programming to allow for different evaluation of the different credentials. Similarly, some embodiments provide real-time integration with existing technology assets, and/or enable real time communications between many guest mobile devices and numerous properties. At least the above features provide significant guest advantages and/or experience, and provide unparalleled guest experience, for example, with the most up to date information from a relevant property.

Some embodiments are configured to extend the security credentials and/or mechanisms, and/or existing security credentials and corresponding mechanisms put forth by the door lock vendors. This extension, at least in part, is provided by providing an additional or alternative channel to transmit the security credentials to the door lock system 112. Further, some embodiments provide a parallel path to provide the same security credentials, while providing the guest with the convenience of using her/his mobile device to deliver the security credentials. The validation of the credentials and triggering the door lock to open, in many embodiments, is substantially if not exactly the same when the security credentials are provide through a key card or other such device.

Further, some embodiments provide an ability to broker communications between mobile user devices (e.g., Bluetooth, BLE or other such short range wireless communication enabled mobile devices), and the NFC/magnetic stripe reader fitted to the door lock. Additionally, some embodiments retrieve the security credentials from a door lock vendor server (which may be local to the property) through a series of web/application services. Some embodiments further validate a guest's access to the guest room in a fashion identical to the existing authentication mechanism.

Accordingly, some embodiments provide "Straight to Room" functionality through the implementation of short range and/or low power wirelessly communication broker circuitry and/or system (e.g., Bluetooth low energy ("BLE") broker device) that enables guests to use her/his mobile phone or other such portable user device (e.g., a smart phone with BLE) to unlock a door of her/his guest room instead of needing to obtain from the front desk and use a traditional physical key card. Some embodiments utilize small and/or miniature wireless receiver circuitry, device and/or system that is readily cooperated with and/or incorporated within new or existing door lock systems, and that accepts security credentials (e.g., Mifare Classic and/or Ultralight security credentials). Further, in some implementations, this wireless receiver is configured to emulates an RFID enabled card to a standard RFID reader fitted to the door lock; emulate a magnetic stripe card by accepting the standard guest room magnetic stripe security credentials (e.g., over a BLE channel) and integrating with a door lock to simulate the magnetic stripe key card that would otherwise be swiped through the door lock; and/or emulate other such credential readers.

Further, some embodiments provide a guest's mobile user device with a public source application and/or proprietary mobile device application. Similarly, some embodiments merely provide an update to already existing mobile device applications to accept and communicate the received credentials. The mobile application can be configured to communicate with a central service (e.g., Hilton's central IT systems) through a well-published API. In some embodiments, the access through the API can validate information (e.g., the guest's information and/or profile, reservation details and room information contained in the central service), and/or retrieve the security key credentials that can be used through the guest's mobile user device to unlock the door of the guest's room. In some implementations and/or applications, these security key credentials are generated by a door lock vendor server software running at the property, and often are the exact same credentials used by the property to create physical key cards (e.g., NFC, magnetic stripe, etc.) and/or other such keys. Upon retrieving the security credentials from the vendor server software and/or through the API, the mobile application operating on the guest's mobile user device is configured to initiate communications with the wireless receiver 218 or other such reader cooperated with and/or installed in the guest room door lock system 112, and passes one or more security key credentials to the receiver (e.g., over a BLE communications channel). In some embodiments, the wireless receiver cooperated with and/or incorporated into the door lock system 112 is dependent on a type of door lock (NFC, magnetic stripe, etc.), and in some implementations acts as a channel to handoff the security key credentials to the door lock components for validation, causing the door lock to be triggered (opened or closed).

Further, some embodiments provide one or more computer-readable storage mediums storing one or more computer programs configured for use in providing user with access to a guest room, the one or more computer programs configured to cause a computer and/or processor based system to execute steps comprising: receiving, at a portable consumer electronic user device, an instruction to communicate a security credential to a door lock system configured to unlock a lock of the door lock system on a door to a guest room upon verifying the security credential; accessing the security credential stored local on the user device; and wirelessly communicating the security credential to the door lock system to be verified by the door lock system.

Some embodiments provide apparatuses for use in unlocking a door of a guest room, the apparatuses comprise: a lock controller configured to couple with and control an electromechanical lock system of a door; a primary credentials reader coupled with the lock controller, wherein the primary credentials reader is configured to obtain a primary security credential from a primary credentials source and provide the lock controller with the primary security credential; and a low power wireless receiver coupled with the lock controller and configured to wirelessly receive, from a portable consumer electronic user device positioned proximate the wireless receiver and having processor readable memory configured to store an alternate security credential, and to forward the alternate security credential to be received by the lock controller; wherein the lock controller is configured to activate the lock system of the door to unlock the door allowing the door to be opened in response to verifying that the alternate security credential.

Some embodiments include methods of providing a secure locking systems, comprising: obtaining an alternate security credentials system; cooperating the alternate security credentials system with an existing door lock system configured to provide lock control of a door lock, wherein the existing door lock system comprises a primary credentials receiver configured to receive primary security credentials through a different method than the alternate security credentials system is configured to receive alternate security credentials. The methods, in some instances, can further comprise: activating the alternate security credentials system; and wirelessly receiving a first alternate security credential from a portable consumer electronic user device. Additionally or alternatively, some embodiments further comprise communicating, from the alternate security credentials system, the first alternate security credential to a credentials evaluator such that the credentials evaluator is unaware that the alternate security credential was not received through the primary credentials receiver.

Still further, some embodiments provide methods of providing a guest with security credentials to gain access to a guest room, comprising: identifying a user; identifying a guest room of multiple guests rooms at a property and with which the user is intended to occupy; acquiring a first security credential intended to be programmed into a door lock system of a door to the identified guest room; and communicating, over a distributed network, the first security credential to a portable consumer electronic user device associated with the user to be stored on the smartphone such that the smartphone is configured to wirelessly communicate the first security credential to the door lock system to gain access to the guest room. Some embodiments further comprise: communicating, over the distributed network, the first security credential to the door lock system to be stored by the door lock system and used to validate the first security credential when received from the smartphone and in response to the validation to open the door. Additionally, some embodiments further comprise confirming that the guest room is available; wherein the communicating the first security credential to the door lock system comprises communicating the first security credential to the door lock system in response to confirming the guest room is available; and preventing the communicating the first security credential at least to the door lock system when the guest room is not available. Further, some embodiments communicate, in response to confirming the guest room is not available, a notification to the user device that the first security credential is invalid; and/or communicate, in response to confirming the guest room is not available, a notification to the user device that the guest room is unavailable.

With some embodiments, methods provide a guest with security credentials to gain access to a guest room, comprising: identifying a user; identifying a guest room of multiple guests rooms at a property and with which the user is intended to occupy; acquiring a first security credential intended to be programmed into a door lock system of a door to the identified guest room; and communicating, over a distributed network, the first security credential to a portable consumer electronic user device associated with the user to be stored on the smartphone such that the smartphone is configured to wirelessly communicate the first security credential to the door lock system to gain access to the guest room. In some instances, the methods further comprise: receiving a request from the user for a room reservation; reserving the guest room for the user; and associating the user with the guest room. The reserving the guest room can further comprise: providing information to the user identifying a plurality of available rooms during a desired period; and receiving, from the user, a selection of the guest room. The communicating the first security credential can, in some embodiments, comprise communicating the first security credential through an application being implemented on the smartphone. In some embodiments, the methods further comprise communicating the first security credential to a card programming system at the property to be used by the card programming system in storing the first security credentials on a key card (programming the key card) as a primary security credential, wherein the door lock system is configured to read the primary security credentials from the key card to provide access to the guest room.

Further, some embodiments provide methods of providing a guest with security credentials to gain access to a guest room, comprising: identifying a user; identifying a guest room of multiple guests rooms at a property and with which the user is intended to occupy; acquiring a first security credential intended to be validated by a door lock system of a door to the identified guest room; and causing the first security credentials to be communicated, over a distributed network, to a portable consumer electronic user device associated with the user to be stored on the user device such that the user device is configured to wirelessly communicate the first security credential to the door lock system to gain access to the guest room. Some embodiments further comprise authenticating the user device as being associated with the user prior to the causing the first security credential to be communicated to the user device. Additionally or alternatively, in some embodiments the causing the first security credentials to be communicated to the user device comprises communicating, over the distributed network, the first security credential to a credential distribution service that is configured to distribute the first security credentials to the user device, wherein the door lock system is configured to validate the first security credential when received from the user device and unlock the lock in response to validating the first security credentials wirelessly received from the user device.

Still further, some embodiments provide an apparatus for use in unlocking a door of a guest room, comprising: a lock controller configured to couple with and control an electromechanical lock system of a door; a primary credentials reader coupled with the lock controller, wherein the primary credentials reader is configured to obtain a primary security credential from a primary credentials source and provide the lock controller with the primary security credential; and a low power wireless receiver coupled with the lock controller and configured to wirelessly receive, from a portable consumer electronic user device positioned proximate the wireless receiver and having processor readable memory configured to store an alternate security credential, the alternate security credential and to forward the alternate security credential to the lock controller; wherein the lock controller is configured to activate the lock system of the door to unlock the door allowing the door to be opened in response to verifying the alternate security credential. In some instances, the alternate security credential is substantially identical to the primary security credential and in a format as would be received by the primary credentials reader from the primary credential source. The apparatus can further comprise: a housing configured to mount on the door, wherein the lock controller, the primary credentials reader and the low power wireless receiver are positioned within the housing. Further, in some implementations the primary credentials reader is positioned relative to a slot configured to receive a card comprising a magnetic stripe, and the primary credentials reader is configured to read the primary security credentials from the magnetic stripe. Additionally or alternatively, in some embodiments the primary credentials reader comprises a radio frequency identifier (RFID) reader configured to wirelessly acquire the primary security credentials from an RFID enabled card programmed with and storing the primary security credential.

Some embodiments provide a method of providing a secure locking system, comprising: opening a housing of an electromechanical door lock system mounted on a door; positioning a wireless receiver within the housing, wherein the wireless receive comprises a low power wireless receiver configured to wirelessly receive a security credential wirelessly communicated from a portable consumer electronic user device located proximate the wireless receiver and having processor readable memory configured to store the security credential; coupling the wireless receiver with a lock controller of the door lock system, wherein the wireless receiver is further configured to forward the security credential to the lock controller; and closing the housing of the door lock system such that the lock controller and the wireless receiver are positioned within the housing. In some implementations the lock system further comprises a primary credentials reader coupled with the lock controller, wherein the primary credentials reader is configured to obtain a primary security credential from a primary credentials source that is different that the user device and provide the lock controller with the primary security credential. Additionally or alternatively, in some embodiments the coupling the wireless receiver with the lock controller comprises: identifying one or more inputs of the lock controller that the primary credentials reader is already coupled with to supply credentials to the lock controller; and coupling the wireless receive with the identified one or more inputs of the lock controller.

In some embodiments, the coupling the alternate security credential system with the lock controller can comprise coupling the alternate security credential system with the lock controller such that the alternate security credential system does not interfere with an acquisition by a primary security credential reader of the locking system of a primary security credential. Additionally or alternatively, in some embodiments the coupling the alternate security credential system with the lock controller comprises coupling the alternate security credential system in parallel with a primary security credential reader coupled with the lock controller of the locking system, such that both the alternate security credential system and the primary security credential reader are in communication with the lock controller of the locking system. Further, in some embodiments, the wireless receiver is further configured to forward the security credential to the lock controller such that the lock controller is unaware that the security credential is received from the wireless receiver.

Exemplary processes and/or methods are representatively described above based on one or more flow diagrams, timing diagrams and/or diagrams representing sequences of actions and/or communications that include one or more steps, subprocesses, communications and/or other such representative divisions of the processes, methods, etc. These steps, subprocesses or other such actions can be performed in different sequences without departing from the spirit of the processes, methods and apparatuses. Additionally or alternatively, one or more steps, subprocesses, actions, etc. can be added, removed or combined in some implementations.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of providing a guest with security credentials to gain access to a guest room, the method comprising:
identifying a user;
identifying a guest room of multiple guests rooms at a property and with which the user is intended to occupy;
causing a security credentials server to generate a first security credential intended to be validated by a door lock system of a door to the identified guest room; and
causing the first security credential to be communicated from the security credentials server to a separate credential distribution service that is configured to distribute the first security credential to a portable consumer electronic user device;
causing a property server to communicate a first notification to the user device that the first security credential is available to be retrieved, wherein the property server is separate from the credential distribution service;
causing, based on an activation by the user of a first option presented to the user through the user device in response to the first notification of the availability of the first security credential, the first security credential to be communicated from the credential distribution service, over a distributed network, to the user device associated with the user to be stored on the user device such that the user device is configured to wirelessly communicate the first security credential to the door lock system to gain access to the guest room.

2. The method of claim 1, further comprising:
authenticating the user device as being associated with the user prior to the causing the first security credential to be communicated to the user device.

3. The method of claim 1, wherein the causing the security credentials server to generate the first security credential comprises communicating, over the distributed network to the security credentials server, a request for one or more security credentials; and
identifying, to the security credentials server, the door lock system associated with the identified guest room.

4. The method of claim 1, further comprising:
confirming that the guest room is available;
wherein the causing the first security credential to be communicated comprises communicating the first security credential in response to confirming the guest room is available; and
preventing the first security credential from being communicated at least to the user device when the guest room is not available.

5. The method of claim 1, further comprising:
receiving, from the user device while the user device is remote from the property and through an application implemented on the user device configured to facilitate an exchange of relevant information with the user device and display a user interface, a request to perform a check-in procedure for the guest room communicated in response to a selection of a check-in option made available through the user interface;
wherein the causing the security credentials server to generate the first security credential comprising causing the security credentials server to generate the first security credential, while the user device is remote from the property, based on the request to initiate the check-in procedure and as part of the check-in procedure; and
wherein the causing the first security credential to be communicated to the user device comprises causing the first security credential to be communicated to the user device while the user device is remote from the property.

6. The method of claim 1, further comprising:
communicating the first security credential to a card programming system at the property to be used by the card programming system in programming a key card that is separate from and unassociated the user device to include the first security credential as a primary security credential, wherein the door lock system is configured to read the primary security credentials from the key card to provide access to the guest room.

7. A method of allowing a user to gain access to a guest room, the method comprising:
accessing, from a portable consumer electronic user device communicating over a distributed network, a remote service;
communicating, through the user device and while the user device is remote from a property having the guest room, authentication information to the remote service;
receiving, at the user device from the remote service, a first notification identifying that a first security credential is available to be retrieved from a credential distribution service that is separate from the remote service, wherein the credential distribution service receives the first security credentials from a security credentials server of the remote service;
detecting an activation, by a user operating the user device, of a first option presented to the user through the user device in response to the first notification of the availability of the first security credential;
requesting, in response to the activation of the first option and over the distributed network, the first security credential from the credential distribution service, wherein the first security credential is configured to be communicated by the user device to a door lock system of the guest room to allow a user to gain access to the guest room; and
receiving, at the user device and from the separate credential distribution service while the user device is remote from and not at the property having the guest room, the first security credential and storing within the user device the first security credential configured to be wirelessly communicated by the user device to the door lock system to gain access to the guest room when the first security credential is verified by the door lock system.

8. The method of claim 7, further comprising:
implementing a mobile application on the user device, wherein the mobile application during implementation is configured to establish the communication with the remote service and control options, comprising the first option, available to the user through the user device in acquiring the first security credential.

9. The method of claim 8, wherein the requesting the first security credential comprises:
displaying, through the mobile application, the first option to initiate the retrieval of the first security credential; and
wherein the requesting the first security credential comprises requesting the first security credential in response to detecting the selection of the first option to initiate the retrieval of the first security credential.

10. The method of claim 8, further comprising:
displaying on the user device, as controlled in accordance with the mobile application, a check-in interface;
wherein the displaying the first option to initiate the retrieval of the first security credential comprises displaying the first option to acquire an electronic key.

11. The method of claim 8, wherein the communicating the authentication information comprises accessing, through the mobile application operated on the user device, a user account maintained by the remote service and corresponding to the user;
wherein the requesting the first security credential comprises requesting the first security credential for the door lock system to the guest room corresponding to a reservation associated with the user account.

12. A system for use in distributing security credentials, the system comprising:
hospitality server communicationally coupled with a distributed network and configured to generate and make accessible over the distributed network an application program interface, wherein the application program interface is configured to communicate at least with a portable consumer electronic user device configured to receive one or more first security credentials and to wirelessly transmit at least one of the one or more first security credentials to a door lock system;
a property server communicationally coupled with the hospitality server and configured to cause one or more security credentials to be distributed; and
a security credentials server remote from and communicatively coupled with the property server, wherein the security credentials server is configured to generate the one or more security credentials and communicate the one or more security credentials to a separate credential distribution service that is configured to distribute the first security credentials to a portable consumer electronic user device;
wherein the property server is configured to cause a first notification to be communicated to the user device that the first security credential are available to be retrieved, and to causing, based on an activation by the user of a first option presented to the user through the user device in response to the first notification of the availability of the first security credential, the first security credential to be communicated from the separate credential distribution service, over a distributed network, to the user device associated with the user to be stored on the user device such that the user device is configured to wirelessly communicate the first security credential to the door lock system to gain access to the guest room.

13. The method of claim 1, wherein the causing the first security credential to be communicated to the separate credential distribution service comprises causing the first security credential to be communicated to the separate credential distribution service operated separate from an entity operating the property and providing buffering and security, and wherein the causing the first security credential to be communicated to the user device comprises causing the first security credential to be communicated from the credential distribution service over the Internet to the user device.

14. The method of claim 1, wherein the causing the first security credential to be communicated to the credential distribution service further comprises causing first authentication information corresponding to the first security credential to the credentials distribution service; and the causing the first notification to be communicated to the user device comprises causing second authentication information, corresponding to the first security credential, to be communicated to the user device that is to be communicated by the user device to the credentials distribution service in authenticating a request from the user device requesting the first security credential be communicated to the user device.

15. The method of claim 14, further comprising:
causing the credentials distribution service to authenticate the user of the user device based on a password received from the user through a user interface on the user device before the first security credential is communicated to the user device.

16. The method of claim 14, further comprising:
causing an application program interface remote from and communicatively coupled with the user device to generate a push notification comprising the first notification that the security credentials are available through the credentials distribution service.

17. The method of claim 1, further comprising:
receiving, from the user device and through an application implemented on the user device configured to facilitate an exchange of relevant information with the user device and display a user interface, the request to retrieve the first security credential communicated in response to a selection of the first option displayed through the user interface in response to the first notification.

18. The method of claim 17, wherein the causing the first notification to be communicated to the user device comprises confirming, prior to causing the first notification to be communicated to the user device, that the user authorized receiving security credentials on the user device through a selection of a second option displayed through the user interface.

* * * * *